United States Patent
Gardner et al.

(10) Patent No.: US 10,938,580 B2
(45) Date of Patent: Mar. 2, 2021

(54) SYSTEM AND DEVICE EMPLOYING PHYSICAL UNCLONABLE FUNCTIONS FOR TAMPER PENALTIES

(71) Applicant: Analog Devices, Inc., Norwood, MA (US)

(72) Inventors: Douglas J. Gardner, Palm Harbor, FL (US); John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 211 days.

(21) Appl. No.: 15/615,634

(22) Filed: Jun. 6, 2017

(65) Prior Publication Data

US 2018/0351753 A1 Dec. 6, 2018

(51) Int. Cl.
| | |
|---|---|
| *H04L 29/00* | (2006.01) |
| *H04L 9/32* | (2006.01) |
| *G06F 21/72* | (2013.01) |
| *G06F 21/75* | (2013.01) |
| *G06F 21/73* | (2013.01) |
| *H04L 9/08* | (2006.01) |

(52) U.S. Cl.
CPC ............ *H04L 9/3278* (2013.01); *G06F 21/72* (2013.01); *G06F 21/73* (2013.01); *G06F 21/75* (2013.01); *H04L 9/085* (2013.01); *H04L 9/3218* (2013.01); *H04L 2209/12* (2013.01)

(58) Field of Classification Search
CPC ..... H04L 9/3278; H04L 9/085; H04L 9/3218; H04L 2209/12; G06F 21/72; G06F 21/73; G06F 21/75
See application file for complete search history.

(56) References Cited

U.S. PATENT DOCUMENTS

| | | | |
|---|---|---|---|
| 8,446,250 B2 | 5/2013 | Kursawe et al. | |
| 8,458,489 B2 | 6/2013 | Beckmann et al. | |
| 8,912,817 B2 | 12/2014 | Wang et al. | |
| 8,918,647 B1 | 12/2014 | Wallrabenstein | |
| 9,806,718 B2 | 10/2017 | Wallrabenstein | |
| 2006/0023887 A1 | 2/2006 | Agrawal et al. | |
| 2006/0045262 A1 | 3/2006 | Orlando | |
| 2009/0083833 A1 | 3/2009 | Ziola et al. | |
| 2010/0037055 A1* | 2/2010 | Fazio | H04L 9/3255 713/171 |

(Continued)

FOREIGN PATENT DOCUMENTS

EP 2 320 344 A2 7/2011

OTHER PUBLICATIONS

Abe et al., Adaptively Secure Feldman VSS and Applications to Universally-Composable Threshold Cryptography. Advances in Cryptology, CRYPTO 2004. 2004;3152:317-34.

(Continued)

*Primary Examiner* — Joseph P Hirl
*Assistant Examiner* — Chi D Nguy
(74) *Attorney, Agent, or Firm* — Wolf, Greenfield & Sacks, P.C.

(57) ABSTRACT

One or more hardware identity circuits (which may be reconfigurable) may be employed in a device or system in order to impose a tampering penalty, preferably without relying on battery-backed volatile memory to do so. The device or system may also include a cryptographic division and distribution ('sharing') of a secret internal to the device or system.

20 Claims, 6 Drawing Sheets

(56) References Cited

U.S. PATENT DOCUMENTS

| | | | |
|---|---|---|---|
| 2010/0085075 | A1 | 4/2010 | Luzzi et al. |
| 2010/0131752 | A1* | 5/2010 | Flegel .................... H04L 9/085 |
| | | | 713/152 |
| 2010/0176920 | A1 | 7/2010 | Kursawe et al. |
| 2012/0183135 | A1 | 7/2012 | Paral et al. |
| 2013/0246809 | A1 | 9/2013 | Beckmann et al. |
| 2014/0140513 | A1 | 5/2014 | Brightley et al. |
| 2014/0225639 | A1 | 8/2014 | Guo et al. |
| 2015/0192637 | A1* | 7/2015 | Falk ........................ G06F 21/55 |
| | | | 326/16 |
| 2016/0154981 | A1 | 6/2016 | Wesselhoff |
| 2016/0269186 | A1 | 9/2016 | Wallrabenstein |
| 2017/0063559 | A1* | 3/2017 | Wallrabenstein ..... H04L 9/3066 |
| 2017/0149572 | A1 | 5/2017 | Wallrabenstein |
| 2018/0096172 | A1* | 4/2018 | Lu .......................... G06F 21/86 |
| 2018/0351752 | A1 | 12/2018 | Wallrabenstein et al. |
| 2018/0351754 | A1 | 12/2018 | Wallrabenstein et al. |

OTHER PUBLICATIONS

Bilgin et al., A More Efficient AES Threshold Implementation. Cryptology ePrint Archive. Report 2013/697. 2013. 17 pages.

Blakley, Safeguarding cryptographic keys. Proceedings of the 1979 AFIPS National Computer Conference. 1979;313-7.

Changgen et al., Threshold Signcryption Scheme Based on Elliptic Curve Cryptosystem and Verifiable Secret Sharing. International Conference on Wireless Communications, Networking and Mobile Computing. Sep. 26, 2005;2:1136-9.

Chen et al., An efficient threshold group signature scheme. IEEE Region 10 Conference TENCON. Nov. 24, 2004;2(B):13-6.

Chen, Reconfigurable physical unclonable function based on probabilistic switching of RRAM. Electron Lett. Apr. 13, 2015;51(8):615-7.

Eichhorn et al., Logically Reconfigurable PUFs: Memory-based Secure Key Storage. Proceedings of the Sixth ACM Workshop on Scalable Trusted Computing, STC '11. Oct. 17, 2011;59-64. 6 pages.

Ertaul, ECC Based Threshold Cryptography for Secure Data Forwarding and Secure Key Exchange in MANET (I). Networking 2005, Networking Technologies, Services, and Protocols; Performance of Computer and Communication Networks; Mobile and Wireless Communications Systems. 2005;3462:102-13.

Feldman, A Practical Scheme for Non-interactive Verifiable Secret Sharing. Proceedings of the $28^{th}$ Annual Symposium on Foundations of Computer Science, SFCS '87. 1987; 427-37.

Frankel et al., Optimal-Resilience Proactive Public-Key Cryptosystems. 38th Annual Symposium on Foundations of Computer Science. 1997;384-93. 12 pages.

Gennaro et al., Secure Applications of Pedersen's Distributed Key Generation Protocol. Topics in Cryptology, CT-RSA 2003. 2003;2612:373-90.

Gennaro et al., Secure Distributed Key Generation for Discrete-Log Based Cryptosystems. Advances in Cryptology. Eurocrypt 99. 1999;1592:295-310. 16 pages.

Herzberg et al., Proactive Public Key and Signature Systems. Proceedings of the 4th ACM Conference on Computer and Communications Security, CCS '97. 1997;100-10. 11 pages.

Herzberg et al., Proactive Secret Sharing or: How to Cope With Perpetual Leakage. Advances in Cryptology, CRYPTO 95. 1995;963:339-52.

Horstmeyer et al., Physically secure and fully reconfigurable data storage using optical scattering. IEEE International Symposium on Hardware Oriented Security and Trust (HOST). May 5-7, 2015;157-62. 6 pages.

Ibrahim et al., A Robust Threshold Elliptic Curve Digital Signature Providing a New Verifiable Secret Sharing Scheme. IEEE 46th Midwest Symposium on Circuits and Systems. 2003;1:276-80. 5 pages.

Jarecki et al., Adaptively Secure Threshold Cryptography: Introducing Concurrency, Removing Erasures (Extended Abstract). Advances in Cryptology. EUROCRYPT 2000. 2000;1807:223-45.

Katzenbeisser et al., Recyclable PUFs: logically reconfigurable PUFs. J Cryto Eng. 2011;1(3):177-86. 15 pages.

Kim et al., Threshold Signature Schemes for ElGamal Variants. Computer Standards and Interfaces. 2011;33(4):432-7.

Kursawe et al., Reconfigurable Physical Unclonable Functions—Enabling Technology for Tamper-Resistant Storage. 2009 IEEE International Hardware-Oriented Security and Trust, HOST '09. 2009;22-9.

Lao et al., Reconfigurable architectures for silicon Physical Unclonable Functions. IEEE International Conference on Electro/Information Technology (EIT). May 15-17, 2011;1-7.

Libert et al., Adaptively Secure Forward-Secure Non-interactive Threshold Cryptosystems. Inscrypt'11 Proceedings of the 7th international conference on Information Security and Cryptology. Nov. 30-Dec. 3, 2012;7537:1-21.

Majzoobi et al., Techniques for Design and Implementation of Secure Reconfigurable PUFs. ACM Trans Reconfig Tech Sys. Mar. 2009;2(1):5.1-33.

Moradi et al., Pushing the Limits: A Very Compact and a Threshold Implementation of AES. Advances in Cryptology—EURPCRYPT 2011. 2011;6632:69-88.

Nikova et al., Threshold Implementations Against Side-Channel Attacks and Glitches. Information and Communications Security. 2006;4307:529-45. 17 pages.

Pedersen, A Threshold Cryptosystem without a Trusted Party. Advances in Cryptology, EUROCRYPT 91. 1991;547:522-6.

Pedersen, Non-Interactive and Information-Theoretic Secure Verifiable Secret Sharing. Advances in Cryptology, CRYPTO 91. 1992;576:129-40.

Sardar et al., Zero Knowledge Proof in Secret Sharing Scheme Using Elliptic Curve Cryptography. ObCom 2011, Part I, CCIS. Global Trends in Computing and Communication Systems. 2012;269:220-6.

Shamir, How to Share a Secret. Commun ACM. Nov. 1979;22(11):612-3.

Shao, Repairing Efficient Threshold Group Signature Scheme. Intl J Netw Sec. Sep. 2008;7(2):218-22.

Tang, Ecdkg: A Distributed Key Generation Protocol Based on Elliptic Curve Discrete Logarithm. Technical Report 04-838, Department of Computer Science, University of Southern California. 2004. 20 pages.

Wang et al., Verifiable $(t, n)$Threshold Signature Scheme based on Elliptic Curve. Wuhan Univ J Natural Sci. 2005;10(1):165-8.

Zhang et al., Exploiting Process Variations and Programming Sensitivity of Phase Change Memory for Reconfigurable Physical Unclonable Functions. IEEE Transactions on Information Forensics and Security. Jun. 2014;9(6):921-32.

Zheng et al., How to Construct Efficient Signcryption Schemes on Elliptic Curves. Inf Process Lett. 1998;68(5):227-33.

Zheng, Digital Signcryption or How to Achieve Cost(Signature & Encryption) « Cost(Signature) + Cost(Encryption). Advances in Cryptology, CRYPTO '97. 1997;1294:165-79. 15 pages.

International Search Report and Written Opinion dated Jun. 3, 2016 for Application No. PCT/US2016/021275.

Asaeda et al., Structuring Proactive Secret Sharing in Mobile Ad-hoc Networks. 2006 1st International Symposium on Wireless Pervasive Computing. Jan. 18, 2006. 6 pages.

Horstmeyer et al., Physically secure and fully reconfigurable data storage using optical scattering. IEEE International Symposium on Hardware Oriented Security and Trust (HOST). 2015;157-62. 6 pages.

Lao et al., Reconfigurable architectures for silicon physical unclonable functions. IEEE International Conference on Electro/Information Technology (EIT). 2011;1-7.

Maes et al., Intrinsic PUFs from flip-flops on reconfigurable devices. 3rd Benelux Workshop on Information and System Security (WISSec 2008). 2008. 17 pages.

(56) References Cited

OTHER PUBLICATIONS

Zhang et al., Exploiting Process Variation and Programming Sensitivity of Phase Change Memory for Reconfigurable Physical Unclonable Functions. IEEE Trans Info Forensics Sec. 2014;9(6):921-32.
International Search Report and Written Opinion dated Sep. 20, 2018 in connection with International Application No. PCT/US2018/036014.
Extended European Search Report dated Sep. 28, 2018 in connection with European Application No. EP 16759655.0.
International Preliminary Report on Patentability dated Dec. 19, 2019 in connection with International Application No. PCT/US2018/036014.
PCT/US2018/036014, Dec. 19, 2019, International Preliminary Report on Patentability.
U.S. Appl. No. 14/704,915, filed May 5, 2015, Wallrabenstein.
U.S. Appl. No. 14/746,054, filed Jun. 22, 2015, Wallrabenstein.
U.S. Appl. No. 15/176,766, filed Jun. 8, 2016, Wallrabenstein.
PCT/US2016/021275, Jun. 3, 2016, International Search Report and Written Opinion.

* cited by examiner

SYSTEM AND DEVICE EMPLOYING PHYSICAL UNCLONABLE FUNCTIONS FOR TAMPER PENALTIES

FIELD OF THE DISCLOSURE

This disclosure relates generally to anti-tampering measures for hardware, and in particular but not exclusively, to tamper-resistant systems and devices employing physical unclonable functions to impose tamper penalties.

BACKGROUND

Tamper-resistant measures are often employed in hardware that may be a target for unauthorized access through tampering, such as advanced computing systems, weaponry, etc. One tamper-resistant measure utilizes penalties whereby hardware remains functional despite a specified number of tamper events, so as to accommodate benign events that may be indistinguishable from tampering. In this case, a detected event triggers a penalty, and the system is irreversibly disabled upon the detection of a specified number of events. One way of doing this is to provision a device with n closed fuses and configure it such that each tamper event results in a penalty whereby one fuse is burnt open. After n detected tampering events, the device will no longer have any closed fuses creating an open circuit that disables the device. An adversary with physical access may be able to physically circumvent opened fuses, however, by creating a short to re-close them and effectively reset the tamper penalty count indefinitely.

Another approach to imposing and enforcing tamper penalties is to store a device's private cryptographic key and a tamper event counter in battery-backed volatile memory. In the event the tamper counter exceeds the allowed number of events, the device is permanently disabled by overwriting the private cryptographic key in its volatile memory. The private key and tamper event counter are maintained across power cycles, since the volatile memory has battery-supplied power; however, battery-backed volatile memory is not possible or appropriate in many applications.

A physical unclonable function or 'PUF' is a physical entity capable of generating an output ('response') to a given input ('challenge') that is unique to that particular PUF such that it can be regarded as a 'fingerprint.' This capacity is typically arrived at by devising the PUF in such a way that its output depends upon features that differ randomly in each device due to minor manufacturing variations. Thus a PUF cannot be readily replicated with the correct fingerprint, even with full knowledge of its circuit layout.

SUMMARY OF THE DISCLOSURE

In an embodiment, one or more PUFs (which may be RPUFs) may be employed in a device or system in order to impose a tampering penalty, preferably without relying on battery-backed volatile memory to do so. The device or system may also include a cryptographic division and distribution ('sharing') of a secret on the device or system. In some examples, the sharing can be done internally on the device or system.

In an embodiment, a device or system having a tamper penalty scheme is disclosed that comprises a tamper sensor configured to produce a tamper signal upon detection of a tamper event; one or more physical unclonable functions (PUFs) each having one or more challenge-response mappings; and a processor connected to the tamper sensor and to the one or more physical unclonable functions, the processor configured to derive correspondences between a plurality of shares of a secret and respective challenge-response mappings of the one or more PUFs, the processor further configured to preclude proper operation of the device in the absence of enough shares to have knowledge of the secret, the processor further configured to cause the invalidation of a share and corresponding challenge-response mapping upon receipt of a tamper signal from the tamper sensor, wherein, upon a specified number of share and corresponding challenge-response mapping invalidations, the device or system cannot generate sufficient shares of the secret to have knowledge of the secret.

According to one aspect, a tamper resistant authentication device including a tamper threshold is provided. The device comprises a tamper sensor for detecting a tamper event, one or more physical unclonable functions (PUFs) for generating respective hardware specific output based on a respective input challenge, and at least one processor connected to the tamper sensor and to the one or more physical unclonable functions, the at least one processor configured to derive correspondences between a plurality of shares of a sensitive value and respective challenge-response mappings of the one or more PUFs, the at least one processor further configured to limit operation of the device in absence of a threshold number of shares sufficient to have knowledge of the sensitive value, wherein the at least one processor invalidates a share and corresponding challenge-response mapping associated with the sensitive value responsive to a tamper signal received from the tamper sensor, wherein, responsive to invalidation of a number of shares and corresponding challenge-response mappings, the device cannot derive operable knowledge of the sensitive value.

According to one aspect, a tamper resistant authentication device including a tamper threshold is provided. The device comprises a tamper sensor for detecting a tamper event, one or more physical unclonable functions (PUFs) for generating respective hardware specific output based on a respective input challenge, and at least one processor connected to the tamper sensor and to the one or more PUFs, the at least one processor configured to: limit operation of the device in absence of a threshold number of valid shares sufficient to regenerate a shared sensitive value, and invalidate a share and corresponding challenge helper pair associated with the sensitive value responsive to a tamper signal received from the tamper sensor.

According to one embodiment, the at least one processor is configured to store challenge helper pairs associating the one or more PUFs to shares of a threshold sharing of the sensitive value. According to one embodiment, the at least one processor is configured to enroll the one or more PUFs in a threshold sharing of the sensitive value without generating the sensitive value in memory. According to one embodiment, the one or more PUFs are reconfigurable PUFs (RPUFs). According to one embodiment, the at least one processor is configured to reconfigure a respective RPUF to invalidate the share and corresponding challenge helper pair.

According to one embodiment, the one or more PUFs are reconfigurable PUFs (RPUFs). According to one embodiment, the one or more RPUFs comprise a plurality of RPUFs, and wherein prior to the imposition of any penalty by the at least one processor, the plurality of RPUFs have a respective challenge-response mapping capable of generating a valid share of the sensitive value. According to one embodiment, the at least one processor reconfigures one of the plurality of RPUFs responsive to receipt of a tamper signal from the tamper sensor invalidating any corresponding challenge-response mappings for the one of the plurality of RPUFs. According to one embodiment, the at least one processor is configured to derive correspondences between the plurality of shares of the sensitive value and respective challenge-response mappings of the plurality of RPUFs encoded with helper values that correspond to respective challenge values.

According to one embodiment, the device further comprises a memory connected to the at least one processor, wherein the at least one processor is configured to store challenge values and corresponding helper values in the memory. According to one embodiment, the plurality of shares of the sensitive value comprise a threshold secret sharing. According to one embodiment, the at least one processor is configured to: derive new correspondences between the plurality of shares of the sensitive value and respective new challenge-response mappings of the one or more PUFs; and store the new challenge-response mappings and associated helper values.

According to one embodiment, the device comprises at least n RPUFs and corresponding shares of a threshold secret, and wherein a minimum of t shares are required to have knowledge of the sensitive value. According to one embodiment, the threshold sharing is constructed for threshold recovery where the minimum of t shares is at least two less than n. According to one embodiment, the one or more PUFs are reconfigurable PUFs (RPUFs) and the at least one processor is configured to randomly select an RPUF to be reconfigured responsive to receipt of a tamper signal from the tamper sensor.

According to one embodiment, the at least one processor encodes information regarding which PUFs, if any, are invalid with the one or more challenge-response mappings. According to one embodiment, the at least one processor is further configured to exclude at least one PUF from a share refresh to invalidate the share and the corresponding challenge-response mapping associated with the sensitive value responsive to a tamper signal received from the tamper sensor.

According to one aspect a computer implemented method for managing a tamper resistant authentication device is provided. The method comprises generating a respective hardware specific output based on a respective input challenge by one or more physical unclonable functions (PUFs), deriving, by at least one processor, correspondences between a plurality of shares of a sensitive value and respective challenge-response mappings of the one or more PUFs, limiting, by the at least one processor, operation of the device in absence of a threshold number of shares sufficient to have knowledge of the sensitive value, invalidating, by the at least one processor, a share and corresponding challenge-response mapping associated with the sensitive value responsive to a tamper signal received from a tamper sensor, wherein, responsive to invalidation of a number of shares and corresponding challenge-response mappings, the tamper resistant authentication device cannot derive operable knowledge of the sensitive value.

According to one aspect a computer implemented method for managing a tamper resistant authentication device is provided. The method comprises generating a respective hardware specific output based on a respective input challenge by one or more physical unclonable functions (PUFs), deriving, by at least one processor, correspondences between a plurality of shares of a sensitive value and respective challenge helper pairs of the one or more PUFs, limiting, by the at least one processor, operation of the device in absence of a threshold number of shares sufficient to regenerate the shared sensitive value, and invalidating, by the at least one processor, a share and corresponding challenge helper pair associated with the sensitive value responsive to a tamper signal received from a tamper sensor.

According to one embodiment, the method further comprises storing for the one or more PUFs a plurality of helper values that correspond to respective challenge-response mapping to valid shares of the sensitive value. According to one embodiment, the plurality of shares of the sensitive value comprise a (t,n) sharing, and the method further comprises provisioning at least n PUFs with corresponding shares, and deriving the sensitive value to require a minimum of t shares to have knowledge of the sensitive value. According to one embodiment, the one or more PUFs are reconfigurable PUFs (RPUFs), and the act of invalidating, by the at least one processor, the share and corresponding challenge-response mapping associated with the sensitive value responsive to the tamper signal received from the tamper sensor includes reconfiguring one of the plurality of RPUFs invalidating any challenge-response mapping for the one of the plurality of RPUFs.

According to one embodiment, the act of invalidating, by the at least one processor, the share and corresponding challenge-response mapping associated with the sensitive value responsive to the tamper signal received from the tamper sensor includes excluding, by the at least one processor, at least one PUF from a share refresh to invalidate the share and the corresponding challenge-response mapping associated with the sensitive value.

According to one aspect, a tamper resistant authentication system including a tamper threshold is provided. The system comprises a tamper sensor for detecting a tamper event, one or more hardware identity circuits for generating respective hardware specific output based on a respective input challenge, and at least one processor connected to the tamper sensor and to the one or more hardware identity circuits, the at least one processor configured to derive correspondences between a plurality of shares of a sensitive value and respective challenge-response mappings of the one or more hardware identity circuits, the at least one processor further configured to limit operation of the system in absence of a threshold number of shares sufficient to have knowledge of the sensitive value, wherein the at least one processor invalidates a share and corresponding challenge-response mapping associated with the sensitive value responsive to a tamper signal received from the tamper sensor, wherein, responsive to invalidation of a number of shares and corresponding challenge-response mappings, the device cannot derive operable knowledge of the sensitive value.

According to one embodiment, the one or more hardware identity circuits comprise one or more physical unclonable functions (PUFs).

According to one aspect, a tamper resistant authentication device including a tamper threshold is provided. The device comprises a tamper sensor for detecting a tamper event, one or more physical unclonable functions (PUFs) for generating respective hardware specific output based on a respective input challenge, and at least one processor connected to the tamper sensor and to the one or more physical unclonable functions, the at least one processor configured to derive correspondences between a plurality of shares of a secret and respective challenge-response mappings of the one or more PUFs, the at least one processor further configured to limit operation of the device in absence of a threshold number of shares sufficient to have knowledge of the secret, wherein the at least one processor invalidates a share and corresponding challenge-response mapping associated with the secret responsive to a tamper signal received from the tamper sensor, wherein, responsive to invalidation of a number of shares and corresponding challenge-response mappings, the device cannot derive operable knowledge of the secret.

According to one embodiment, the one or more PUFs are reconfigurable PUFs (RPUFs). According to one embodiment, the one or more RPUFs comprise a plurality of RPUFs, and wherein prior to the imposition of any penalty by the at least one processor, the plurality of RPUFs have a respective challenge-response mapping capable of generating a valid share of the secret. According to one embodiment, the at least one processor reconfigures one of the plurality of RPUFs responsive to receipt of a tamper signal from the tamper sensor invalidating any corresponding challenge-response mappings for the one of the plurality of RPUFs. According to one embodiment, the at least one processor is configured to derive correspondences between the plurality of shares of the secret and respective challenge-response mappings of the plurality of RPUFs encoded with helper values that correspond to respective challenge values.

According to one embodiment, the device further comprises a memory connected to the at least one processor, wherein the at least one processor is configured to store challenge values and corresponding helper values in the memory. According to one embodiment, the plurality of shares of the secret comprise a threshold secret sharing. According to one embodiment, the at least one processor is configured to: derive new correspondences between the plurality of shares of the secret and respective new challenge-response mappings of the one or more PUFs; and store the new challenge-response mappings and associated helper values. According to one embodiment, the device comprises at least n RPUFs and corresponding shares of a threshold secret, and wherein a minimum of t shares are required to have knowledge of the secret. According to one embodiment, the threshold sharing is constructed for threshold recovery where the minimum of t shares is at least two less than n. According to one embodiment, the one or more PUFs are reconfigurable PUFs (RPUFs) and the at least one processor is configured to randomly select an RPUF to be reconfigured responsive to receipt of a tamper signal from the tamper sensor.

According to one embodiment, the at least one processor encodes information regarding which PUFs, if any, are invalid with the one or more challenge-response mappings. According to one embodiment, the at least one processor is further configured to exclude at least one PUF from a share refresh to invalidate the share and the corresponding challenge-response mapping associated with the secret responsive to a tamper signal received from the tamper sensor.

According to one aspect a computer implemented method for managing a tamper resistant authentication device is provided. The method comprises generating a respective hardware specific output based on a respective input challenge by one or more physical unclonable functions (PUFs), deriving, by at least one processor, correspondences between a plurality of shares of a secret and respective challenge-response mappings of the one or more PUFs, limiting, by the at least one processor, operation of the device in absence of a threshold number of shares sufficient to have knowledge of the secret, invalidating, by the at least one processor, a share and corresponding challenge-response mapping associated with the secret responsive to a tamper signal received from a tamper sensor, wherein, responsive to invalidation of a number of shares and corresponding challenge-response mappings, the tamper resistant authentication device cannot derive operable knowledge of the secret.

According to one embodiment, the method further comprises storing for the one or more PUFs a plurality of helper values that correspond to respective challenge-response mapping to valid shares of the secret. According to one embodiment, the plurality of shares of the secret comprise a (t, n) sharing, and the method further comprises provisioning at least n PUFs with corresponding shares, and deriving the secret to require a minimum of t shares to have knowledge of the secret. According to one embodiment, the one or more PUFs are reconfigurable PUFs (RPUFs), and the act of invalidating, by the at least one processor, the share and corresponding challenge-response mapping associated with the secret responsive to the tamper signal received from the tamper sensor includes reconfiguring one of the plurality of RPUFs invalidating any challenge-response mapping for the one of the plurality of RPUFs.

According to one embodiment, the act of invalidating, by the at least one processor, the share and corresponding challenge-response mapping associated with the secret responsive to the tamper signal received from the tamper sensor includes excluding, by the at least one processor, at least one PUF from a share refresh to invalidate the share and the corresponding challenge-response mapping associated with the secret.

According to one aspect, a tamper resistant authentication system including a tamper threshold is provided. The system comprises a tamper sensor for detecting a tamper event, one or more hardware identity circuits for generating respective hardware specific output based on a respective input challenge, and at least one processor connected to the tamper sensor and to the one or more hardware identity circuits, the at least one processor configured to derive correspondences between a plurality of shares of a secret and respective challenge-response mappings of the one or more hardware identity circuits, the at least one processor further configured to limit operation of the system in absence of a threshold number of shares sufficient to have knowledge of the secret, wherein the at least one processor invalidates a share and corresponding challenge-response mapping associated with the secret responsive to a tamper signal received from the tamper sensor, wherein, responsive to invalidation of a number of shares and corresponding challenge-response mappings, the device cannot derive operable knowledge of the secret.

According to one embodiment, the one or more hardware identity circuits comprise one or more physical unclonable functions (PUFs).

DETAILED DESCRIPTION

Figure 1:
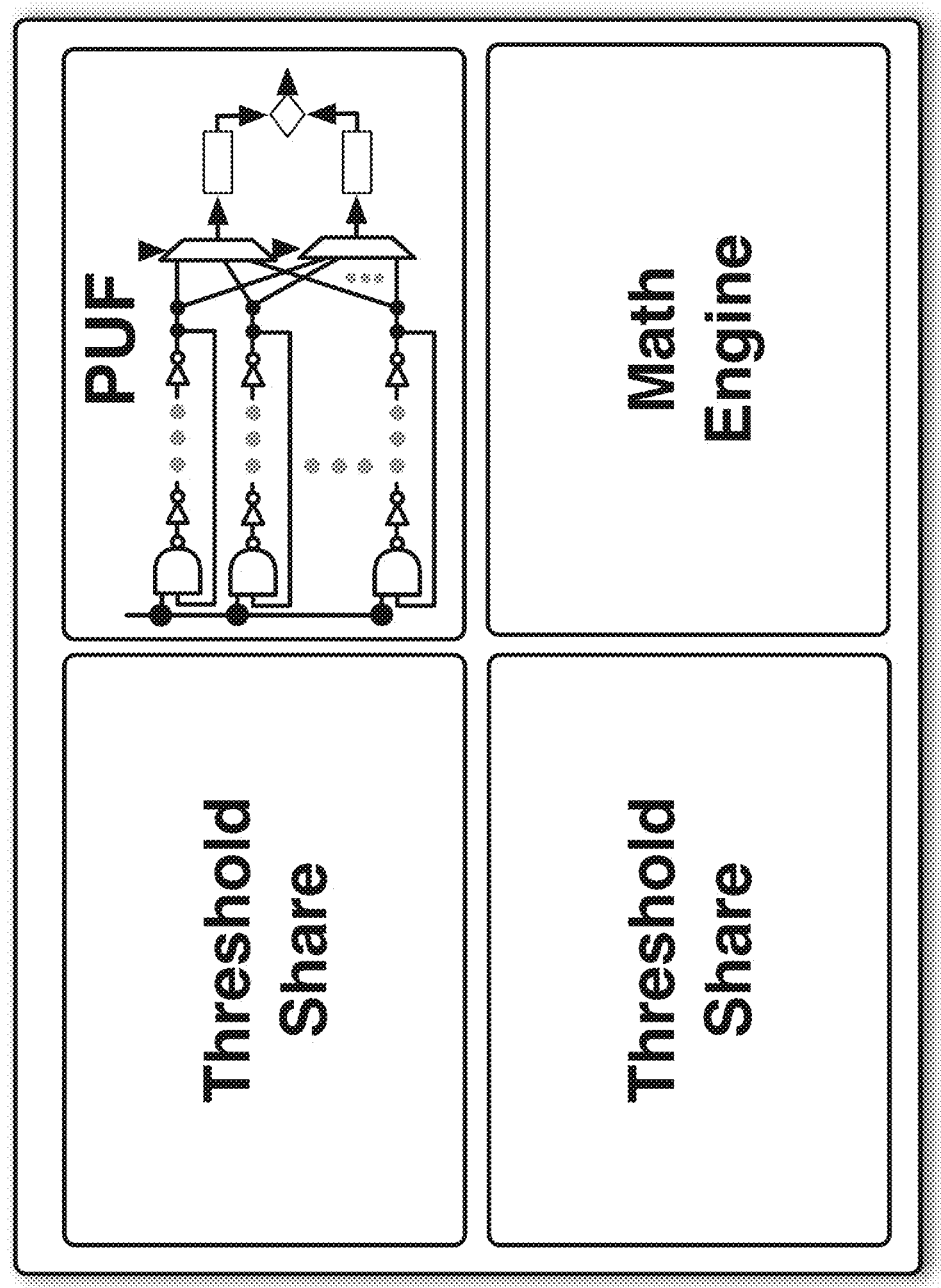
FIG. 1 is a functional diagram of a device with a single PUF circuit having two shares of a sensitive value.

Aspects of the disclosure describe a robust new means of imposing tamper penalties. The following detailed description sets forth details and various embodiments concerning: 1) threshold cryptography, wherein a sensitive value is divided into shares; 2) the use of PUFs with cryptographic shares; 3) the periodic adoption of new ('refreshed' or 'updated') shares; 4) dynamic membership (i.e., removal or addition) of shares in threshold cryptography; and 5) PUF/threshold cryptography-based embodiments of tamper penalties. An illustrative embodiment that employs both RPUFs and share refreshing is described herein by way of example and not limited to utilizing RPUFs and share refreshing. Further, while various embodiments utilizing PUFs are described, the principles and implementation herein may also apply to other suitable approaches for imposing an irreversible tamper penalty, such as a reconfigurable physical property of the silicon that can be irreversibly changed causing the challenge response mapping to be altered, and the discussion is not limited by the various additional features described herein that may be employed with or by virtue of the invention.

Threshold Cryptography

Threshold cryptography involves distributing cryptographic operations among a set of participants such that operations are only possible with the collaboration of a quorum of participants. A trusted dealer D generates a master asymmetric key pair $\langle \mathcal{P}^{pub}, \mathcal{P}^{priv} \rangle$ for the set of participants $p_i \in \mathcal{P}$, $|\mathcal{P}|=n$. The private key is then split among the n participants, with each participant receiving a share of $\mathcal{P}^{priv}$. This constitutes a (t, n) sharing of $\mathcal{P}^{priv}$, such that a quorum of at least t participants combine their private shares in order to perform operations using the master private key.

While other secret schemes can be used, an example is described employing Shamir's polynomial interpolation construction, which can be used for sharing a secret. A polynomial $f(\bullet)$ of degree $t-1$ is defined, where the coefficients $c_i$ remain private: $f(x) = c_0 + c_1 x + \ldots + c_{t-1} x^{t-1} \mod q$. Without knowledge of the coefficients, $f(\bullet)$ can be evaluated when at least t points of $f(\bullet)$ are known by applying Lagrange's polynomial interpolation approach. A private key $\mathcal{P}^{priv}$ can be set as the free coefficient $c_0$ (i.e., $f(0) = \mathcal{P}^{priv}$), and a set of shares of the private key distributed to the participants. To split the private key $\mathcal{P}^{priv}$ among n participants $p_i \in \mathcal{P}_{1 \le i \le n}$, the dealer computes $p_i$'s $\langle$public, private$\rangle$ key pair as $\langle r_i \cdot G \mod q, r_i \rangle$ such that $r_i = f(i)$, $i \ne 0$. Here, $G \in \mathbb{E}/\mathbb{F}_p$ is a base point of order q for elliptic curve E, and $(P)_x$ (resp. $(P)_y$) refers to the x (resp. y) coordinate of point P on curve E. (The modulus that operations are performed under may be omitted where it is apparent from context). The public keys are made available to all participants, while the private keys are distributed securely to each participant (e.g., using the device's public key and ElGamal encryption). All participants are also given access to $(c_j \cdot G)_{0 \le j \le t-1}$, which allows them to verify their secret key and the public keys of other participants by checking that:

$$r_i \cdot G = \sum_{j=0}^{t-1} i^j (c_j \cdot G) \mod p$$

This constitutes a (t, n) verifiable secret sharing (VSS) of the private key $\mathcal{P}^{priv}$, as participants are able to verify the legitimacy of their share with respect to a globally-known public key.

Now, given access to any t shares $\{(i, r_i)\}_{1 \le i \le t}$, where $f(\bullet)$ has degree $t-1$ and $t \le n$, the shares $(i, r_i)$ may be combined through Lagrange polynomial interpolation to evaluate $f(x)$:

$$f(x) = \sum_{i=1}^{t} \left( r_i \cdot \left( \prod_{\substack{j=1 \\ j \ne i}}^{t} \frac{x - x_j}{x_i - x_j} \right) \right) \mod q$$

This allows any quorum of t participants $p_i \in \bar{\mathcal{P}} \subseteq \mathcal{P}$, $|\bar{\mathcal{P}}|=t \le n$ to combine their shares $\{(i, r_i)\}_{1 \le i \le t}$ and recover the polynomial's free coefficient $c_0 = f(0)$, which is the master asymmetric private key $\mathcal{P}^{priv}$. Although the Lagrange form is used for the interpolation polynomial, other approaches (e.g., using a monomial basis or the Newton form) may be substituted in other embodiments. Similarly, although the described construction evaluates $f(\bullet)$ rather than recover the coefficients, alternatively the latter may be accomplished using a Vandermonde matrix representation and solving the system of linear equations.

Although elliptic curve cryptography may be used in some implementations, other embodiments employ various other cryptographic frameworks (e.g., ElGamal, RSA, NTRU, etc.). Likewise, other elliptic curve mechanisms such as Massey-Omura, Diffie-Hellman, Menezes-Vanstone, Koyama-Maurer-Okamoto-Vanstone, Ertaul, Demytko, etc. could be used. A number of threshold cryptographic operations can be carried out within the described framework, using a variety of methods such as threshold encryption, decryption, and signing, threshold zero knowledge proofs of knowledge, threshold signcryption, and distributed key generation.

For example, an entity in possession of a device's enrollment information $\{p_i^{pub}, c_i, helper_i\}$ can thus encrypt a message m such that only the target device is able to recover it, using a method such as ElGamal encryption:

---
ElGamal Encryption
---
for Server s do
    Lookup: challenge $c_i$, generator G, modulus p and Helper $h_i$ for Device $p_i$
    Select $y \in \mathbb{F}_p$ uniformly at random
    Lookup public key $A = p_i^{priv} \cdot G \mod p$ for Device $p_i$
    Generate shared key: $y \cdot G \mod p$
    Encrypt message m by computing $m + (yA)_y \mod q$
    Device $p_i \leftarrow \{yG, m + (yA)_y \mod q, c_i, G, p, h_i\}$
end for

---

Then, if all participants of a group $\bar{\mathcal{P}} \subseteq \mathcal{P}$, where $|\bar{\mathcal{P}}| \ge t$, $|\mathcal{P}|=n$ and $t \le n$, wish to decrypt an encryption (yG, m+ $(yrG)_x$) of a message $m \in [1, p-1]$ using group private key r, threshold ElGamal decryption (e.g., per Ertaul) can be used as described in paragraphs 63-66 of U.S. Patent Application Publication No. 2016/0269186 (the '186 publication) (incorporated herein by reference), and may be accomplished as follows:

Each participant $p_i \in \bar{\mathcal{P}}$ uses their secret key $r_i = f(i)$ to compute a shadow:

$$w_i = \left(\prod_{\substack{j=1 \\ j \neq i}}^{t} \frac{-j}{i-j}\right) \cdot r_i \bmod q$$

Each participant then broadcasts their partial decryption $S_i$ defined as $S_i = w_i \cdot yG \bmod q$.

Each participant locally computes the value:

$$S = \sum_{i=1}^{t} S_i \bmod q$$

$$= \left(\sum_{i=1}^{t} w_i\right) \cdot yG$$

$$= r \cdot yG$$

Finally, each participant may now locally recover the message m by computing $(m+(yrG)_y) - S \bmod q = (m+(yrG)_y) - (ryG)_y = m$.

Likewise, a group $\bar{\mathcal{P}} \subseteq \mathcal{P}$ where $|\bar{\mathcal{P}}| \geq t$, $|\mathcal{P}|=n$ and $t \leq n$, can use a threshold signature scheme to generate a signature representing all of $\mathcal{P}$ for message as follows:

Each participant $p_i \in \bar{\mathcal{P}}$ uses their secret key $r_i = f(i)$ and a random integer $y_i \in \mathbb{F}_y$ to calculate their individual signature $(R_i, S_i)$ for message m.

First, $R_i$ is computed from $y_i \cdot G \bmod p$ and publicized to all participants $p_i \in \bar{\mathcal{P}}$.

Next, each participant $p_i$ calculates R, e, and $S_i$ as follows:

$$R = \sum_{i=1}^{t} R_i \bmod p$$

$$e = h(m, (R)_y \bmod q)$$

$$S_i = y_i + r_i e \left(\prod_{\substack{j=1 \\ j \neq i}}^{t} \frac{-j}{i-j}\right) \bmod q$$

h(•) or H(•) denotes a cryptographic hash function.

Each participant broadcasts $S_i$ to an appointed secretary (for convenience, and who need not be trusted).

The secretary, having received all $(R_i, S_i)$ pairs, verifies the signature by computing:

$$R = \sum_{i=1}^{t} R_i \bmod p$$

$$e = h(m, (R)_y \bmod q)$$

$$R_i = S_i \cdot G + e \left(\prod_{\substack{j=1 \\ j \neq i}}^{t} \frac{-j}{i-j}\right)(-p_i^{pub}) \bmod p$$

If constructed properly, this equation will hold as:

$$R_i \stackrel{?}{=} S_i \cdot G + e\left(\prod_{\substack{j=1 \\ j \neq i}}^{t} \frac{-j}{i-j}\right)(-p_i^{pub}) \bmod p$$

$$= \left(y_i + r_i e \left(\prod_{\substack{j=1 \\ j \neq i}}^{t} \frac{-j}{i-j}\right)\right) \cdot G$$

$$+ e\left(\prod_{\substack{j=1 \\ j \neq i}}^{t} \frac{-j}{i-j}\right)(-r_i G)$$

$$= y_i G + e r_i G \left(\prod_{\substack{j=1 \\ j \neq i}}^{t} \frac{-j}{i-j}\right)$$

$$+ e(-r_i G)\left(\prod_{\substack{j=1 \\ j \neq i}}^{t} \frac{-j}{i-j}\right)$$

$$= y_i G + (e r_i G - e r_i G)\left(\prod_{\substack{j=1 \\ j \neq i}}^{t} \frac{-j}{i-j}\right)$$

$$= y_i G$$

$$:= R_i$$

If these hold, the secretary calculates:

$$S = \sum_{i=1}^{t} S_i \bmod q$$

which computes the group signature $((R)_y \bmod q, S)$ over m.

Upon receipt of (R, S), receiver $p_R$ checks its validity against the public key $\mathcal{P}^{pub}$ of the entire group of participants $p_i \in P_{1 \leq i \leq n}$:

$$e \stackrel{?}{=} h(m, (S \cdot G + e \cdot \mathcal{P}^{pub})_y \bmod q)$$

which holds on valid signatures because:

$$e \stackrel{?}{=} h(m, (S \cdot G + e \cdot \mathcal{P}^{pub})_y \bmod q)$$

$$= h(m, ((y + re) \cdot G + e \cdot (-rG))_y)$$

$$= h(m, (yG + erG - erG)_y)$$

$$= h(m, (yG)_y)$$

$$= h(m, (R)_y \bmod q)$$

U.S. Patent Publication Number 2016/0269186 (incorporated herein by reference in its entirety) describes example implementation for decryption, signatures, signcryption, and dealerless operation that can be used in conjunction with the disclosed embodiments herein.

Likewise, a group $\bar{\mathcal{P}} \subseteq \mathcal{P}$ where $|\bar{\mathcal{P}}| \geq t$, $|\mathcal{P}|=n$ and $t \leq n$, can use a threshold signature scheme to generate a signature representing all of $\mathcal{P}$ for message m as described in paragraphs 68-76 of the '186 publication (incorporated herein by reference), and may be accomplished as follows:

The participants of a group $\bar{\mathcal{P}} \subseteq \mathcal{P}$ where $|\bar{\mathcal{P}}| \geq t$, $|\mathcal{P}|=n$ and $t \leq n$ can also collaborate to demonstrate possession of a shared private key $\mathcal{P}^{priv}=r \in [1, q-1]$ using a threshold zero knowledge proof of knowledge as described in paragraphs 78-85 of the '186 publication (incorporated herein by reference), and may be accomplished as follows:

The group public key is $\mathcal{P}^{pub}=rG$, where r is a shared secret and G is a group generator. The verifier $\mathcal{V}$ chooses an ephemeral nonce N and distributes this to all participants of $\bar{\mathcal{P}}$.

Each participant $p_i \in \bar{\mathcal{P}}$ uses their secret share $r_i = f(i)$ and a random nonce integer $y_i$ to calculate their individual proof $(B_i, M_i)$ of the shared secret r.

First, $B_i$ is computed and publicized to all participants $p_i \in \bar{\mathcal{P}}$:

$$B_i = y_i \cdot G \mod p$$

Each participant locally computes:

$$B = y \cdot G = \sum_{i=1}^{t} B_i \mod p$$

Next, each participant $p_i$ calculates e, $M_i$ as follows:

$$e = h(G, B, \mathcal{P}^{pub}, N)$$

$$M_i = y_i + r_i e \left( \prod_{\substack{j=1 \\ j \neq i}}^{t} \frac{-j}{i-j} \right) \mod q$$

Upon receipt of $(B_i, M_i)_{1 \leq i \leq t}$, the verifier $\mathcal{V}$ computes:

$$B = \sum_{i=1}^{t} B_i \mod p$$

$$M = \sum_{i=1}^{t} M_i \mod q$$

$$e = h(G, B, \mathcal{P}^{pub}, N)$$

Next, the verifier checks the proof's validity against the public key $\mathcal{P}^{pub} = rG$.

$$B \stackrel{?}{=} M \cdot G - e \cdot \mathcal{P}^{pub} \mod p$$
$$= (y + re) \cdot G - e \cdot (rG)$$
$$= yG + reG - reG$$
$$= yG$$

If $B = M \cdot G - e \cdot \mathcal{P}^{pub}$, the verifier $\mathcal{V}$ accepts the threshold zero knowledge proof as valid, and rejects the proof otherwise.

The process of signcrypting a message facilitates performing both signing and encrypting a message at a cost less than computing each separately. Given a message $m \in [1, q-1]$ and a receiver $p_R$ with public key $p_R^{pub}$, signcryption can be generated as described in paragraphs 87-98 of the '186 publication (incorporated herein by reference), and may be accomplished as follows:

Each $p_i \in \mathcal{P}$ selects a random $k_i \in [1, q-1]$ and computes $Y_i = k_i \cdot G$ and publicly broadcasts this to both a secretary (for convenience, and who need not be trusted) and the receiver $p_R$. Each $p_i \in \mathcal{P}$ also computes $Z_i = k_i \cdot p_R^{pub}$ which is privately (for example, using ElGamal encryption) sent to $p_R$.

The secretary computes:

$$Z = \sum_{i=1}^{t} Z_i = \sum_{i=1}^{t} k_i \cdot p_R^{pub} = k \cdot p_R^{pub}$$

$$r = m \cdot (Z)_x \mod p$$

and broadcasts r (not to be confused with $r_i$, participant $p_i$'s share of $\mathcal{P}^{priv}$) to each signer $p_{1 \leq i \leq t}$.

Each signer $p_{1 \leq i \leq t}$ computes:

$$x_i = \prod_{\substack{j=1 \\ j \neq i}}^{t} \frac{-j}{i-j} \mod q$$

$$e_i = r_i \cdot x_i \mod q$$

$$s_i = k_i - e_i \cdot r \mod q$$

where $r_i = f(i)$ is $p_i$'s share of $\mathcal{P}^{priv}$. Each signer sends their partial signcryption $s_i$ to the secretary.

Upon receipt of a partial signcryption $s_i$, the secretary computes $Y_i' = r \cdot x_i \cdot p_i^{pub} + s_i \cdot G$ in order to verify the validity of the partial signcryption by checking $Y_i \stackrel{?}{=} Y_i'$.

Once receiving all partial signcryptions $s_i$ and checking their validity, the secretary combines them to compute:

$$s = \sum_{i=1}^{t} s_i \mod q$$

and (r, s) is the final signcryption sent to receiver $p_R$.

The receiving participant $p_R$, which has now received $\langle \{Y_i = k_i \cdot G\}_{i \in [1 \ldots n]}, (r, s) \rangle$, computes:

$$Y = \sum_{i=1}^{t} Y_i = \sum_{i=1}^{t} (k_i \cdot G) = k \cdot G$$

$$Y' = r \cdot \mathcal{P}^{pub} + s \cdot G$$

$$Z' = p_R^{priv} \cdot Y'$$

The recipient $p_R$ then verifies that:

$$Y' \stackrel{?}{=} r \cdot \mathcal{P}^{pub} + s \cdot G$$
$$= r \cdot \mathcal{P}^{pub} + \sum_{i=1}^{t} s_i \cdot G$$
$$= r \cdot \mathcal{P}^{pub} + G \cdot \sum_{i=1}^{t} (k_i - e_i \cdot r)$$
$$= r \cdot \mathcal{P}^{pub} + \left( G \cdot \sum_{i=1}^{t} k_i \right) - \left( G \cdot \sum_{i=1}^{t} e_i \cdot r \right)$$
$$= r \cdot \mathcal{P}^{pub} + k \cdot G - r \cdot G \cdot \sum_{i=1}^{t} e_i$$
$$= r \cdot \mathcal{P}^{pub} + k \cdot G$$

-continued $$-r \cdot G \cdot \left( \sum_{i=1}^{t} r_i \cdot \left( \prod_{\substack{j=1 \\ j \neq i}}^{t} \frac{-j}{i-j} \right) \right)$$

$$= r \cdot \mathcal{P}^{pub} + k \cdot G - r \cdot G \cdot (f(0))$$

$$= r \cdot \mathcal{P}^{priv} \cdot G + k \cdot G - r \cdot G \cdot \mathcal{P}^{priv}$$

$$= k \cdot G = Y$$

If these hold, the group signature over m is valid.

The recipient $p_R$ can now recover the message m by computing:

$$r \cdot (Z')_x^{-1} = (m \cdot (Z)_x) \cdot (Z')_x^{-1}$$

$$= \left( m \cdot \left( k \cdot p_R^{pub} \right)_x \right) \cdot \left( p_R^{priv} \cdot Y' \right)_x^{-1}$$

$$= (m \cdot (k \cdot (p_R^{priv} \cdot G))_x) \cdot (p_R^{priv} \cdot (k \cdot G))_x^{-1}$$

$$= m$$

With this, the recipient $p_R$ has both verified the group's signature over message m, as well as decrypted m.

While standard threshold cryptographic operations (e.g., those discussed above) traditionally require the presence of a trusted dealer $\mathcal{D}$ to define a generating polynomial f(•), select a secret r, and distribute shares of r to all participants $p_i \in \mathcal{P}$, some distributed key generation protocols remove the necessity of a trusted dealer. This allows a set of participants $\mathcal{P}$ to generate shares of a secret where no one knows the shared secret r, which can be accomplished in the present context as described in paragraphs 100-108 of the '186 publication (incorporated herein by reference) and described below. The distributed key generation protocol is preferably secure against an adversary that attempts to bias the output distribution, as in some known attacks.

Each participant $p_i \in \mathcal{P}$ defines a random polynomial $f_i(\bullet)$ of degree t−1, where t is the threshold. The temporary private value of participant $p_i$ is $c_0^{(i)}$, the free coefficient of $f_i(\bullet)$.

Each participant $p_i \in P$ privately sends $f_i(j)$ to participant $p_j$, $\forall j \in [1, \ldots, n]/i$.

Participant $p_i$ broadcasts $\{c_k^{(i)} \cdot G \bmod p\}_{k \in [0, \ldots, t-1]}$, commitments to the coefficients of $f_i(\bullet)$.

Participant $p_i$ broadcasts $\{f_i(j) \cdot G \bmod p\}_{j \in [0, \ldots, n]}$, the public shares for all participants.

Each participant $p_{j \neq i} \in \mathcal{P}$ must now verify the shares they have received.

First, each participant $p_{j \neq i}$ verifies that:

$$f_i(j) \cdot G \stackrel{?}{=} \sum_{k=0}^{t-1} j^k (c_k^{(i)} \cdot G) \bmod p$$

$$= G \cdot \left( \sum_{k=0}^{t-1} j^k c_k^{(i)} \right)$$

$$= G \cdot f_i(j)$$

Similarly, each participant $p_{j \neq i} \in \mathcal{P}$ verifies that their share is consistent with other shares:

$$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$

$$= G \cdot \sum_{i=1}^{t} \left( \left( \prod_{\substack{j=1 \\ j \neq i}}^{t} \frac{-j}{i-j} \right) f_i(j) \right)$$

$$= G \cdot c_0^{(i)}$$

If these two verifications succeed, each participant $p_i \in \mathcal{P}$ computes its share of the master asymmetric private key r:

$$r_i = \sum_{j=1}^{n} f_j(i) \bmod q$$

Similarly, the master asymmetric public key for the group is computed as:

$$r \cdot G = \sum_{j=1}^{n} \sum_{i=1}^{n} (f_j(i) \cdot G) \bmod p$$

PUF-Enabled Threshold Cryptography

The core functionality of a PUF is extracting a unique mapping between the challenge (input) domain and the response (output) range. As the mapping from challenges to responses is unique for each PUF-enabled device, collecting a set of challenge-response pairs (CRPs) through a provisioning process allows the device to be verified in the future. Protocol 1 illustrates the basic provisioning process that underlies many PUF-enabled protocols.

| Protocol 1: Challenge-Response Provisioning | |
| --- | --- |
| PUF Device D | Server s |
| | ← challenge c ∈ {0, 1}$^{\kappa_1}$ |
| P(c) ↦ r ∈ {0, 1}$^{\kappa_2}$ → | store(D, {c, r}) |

Authentication proceeds by issuing a challenge for which the response is known to the server, and verifying that the response is t-close to the expected response. This naïve protocol is lightweight but has many limitations. During enrollment, a large number of challenge-response pairs are collected, as each pair can only be used once for authentication in conventional protocols. If an adversary observed the response, it could masquerade as the device. Similarly, the challenge-response database is sensitive, as an adversary could apply machine learning to fully characterize the PUF mapping. These issues can be eliminated by applying cryptographic constructs around the PUF functionality.

In the example of an embodiment employing elliptic curve cryptography, Algorithms 1 and 2 below can be used to allow a PUF-enabled device to locally store and retrieve a sensitive value (without needing to store any sensitive information in non-volatile memory). Algorithm 1 illustrates the storing of a sensitive value $\mathcal{V}_i$ using a PUF, and Algorithm 2 illustrates the dynamic regeneration of $\mathcal{V}_i$. The challenge $c_i$ and helper data $helper_i$ can be public, as neither reveals anything about the sensitive value $\mathcal{V}_i$. While the present example uses encryption of $\mathcal{V}_i$ by exclusive-or, $\oplus$, $\mathcal{V}_i$ could also be used as a key to other encryption algorithms (e.g., AES) to enable storage and retrieval of arbitrarily sized values.

---

Algorithm 1 PUF-Store

---

Goal: Store value $\mathcal{V}_i$
for PUF Device d do
    Select finite field $\mathbb{F}_n$ of order n
    Select E, an elliptic curve over $\mathbb{F}_n$
    Find $G \in E/\mathbb{F}_n$, a group generator
    Select challenge $c_i \in \mathbb{F}_n$
    $x = H(c_i, E, G, n)$
    $O = PUF(x)$
    $helper_i = P_i = O \oplus ECC(\mathcal{V}_i)$
    Write $\{c_i, helper_i\}$ to non-volatile memory
end for

---

Algorithm 2 PUF-Retrieve

---

Goal: Retrieve value $\mathcal{V}_i$
for PUF Device d do
    Read $\{c_i, helper_i\}$ from non-volatile memory
    $x \leftarrow H(c_i, E, G, n)$
    $O' = PUF(x)$
    $\mathcal{V}_i \leftarrow D((ECC(\mathcal{V}_i) \oplus O) \oplus O')$
end for

---

Whenever O and O' are t-close, the error correcting code ECC can be passed to a decoding algorithm D to recover the sensitive value $\mathcal{V}_i$.

Using Algorithm 3, a local device can perform an enrollment protocol using the PUF. This allows each PUF circuit to generate a local public key $p_i^{pub}$, which is useful for bootstrapping more complex key setup algorithms (e.g., the distributed key generation protocol in Algorithm 4). When the key setup algorithm is performed internally to the device (rather than externally among a set of distinct devices), this bootstrap process may not be necessary.

---

Algorithm 3 Enrollment

--- for Device d do
    $c_i \in \mathbb{F}_p$, a group element
    $x = H(c_i, E, G, p, q)$
    $O = PUF(x)$
    $helper_i = O \oplus ECC(p_i^{priv} \mod q)$
    $p_i^{pub} = A_i = p_i^{priv} \cdot G \mod p$
    Store $\{p_i^{pub}, c_i, helper_i\}$
end for

---

Next, PUF-based cryptographic primitives are adapted to secret sharing to permit threshold cryptography founded on PUF or other root of trust. Using the example of an embodiment employing elliptic curve cryptography, distributed key generation is used to generate a number of shares (for example, two: $r_1, r_2$) of a master private key $\mathcal{P}^{priv}=(r_1+r_2)$ mod q), which itself is never generated or constructed. The protocol is summarized in Algorithm 4: PUF-DKG, where in an example implementation (t, n) is chosen as (2,2).

---

Algorithm 4 PUF-DKG

---

Goal: Generate shares of master private key $\mathcal{P}^{priv}$
for $1 \leq i \leq n$ do
    Select random polynomial $f_i(\cdot) = c_0^{(i)} + \ldots + c_{t-1}^{(i)}x^{t-1} \mod q$
    Compute $f_i(j), \forall j \in [1, \ldots, n]/i$
    Store coefficient commitments $\{c_k^{(i)} \cdot G \mod p\}_{k \in [0, \ldots, t-1]}$
    Store share commitments $\{f_i(j) \cdot G \mod p\}_{j \in [0, \ldots, n]}$
for $1 \leq i \leq n$ do
    Verify $$f_i(j) \cdot G \stackrel{?}{=} \sum_{k=0}^{t-1} j^k(c_k^{(i)} \cdot G) \mod p$$

Verify $$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \mod p$$

end for
Recover share $$r_i = \sum_{j=1}^{n} \left( \left( \prod_{\substack{j=1 \\ j \neq i}}^{t} \frac{-j}{i-j} \right) f_j(i) \right) \mod q$$

Recover public key $$\mathcal{P}^{pub} = r \cdot G = \sum_{j=1}^{n} \sum_{i=1}^{n} \left( \left( \left( \prod_{\substack{j=1 \\ j \neq i}}^{t} \frac{-j}{i-j} \right) f_j(i) \right) \cdot G \right) \mod p$$

end for

---

Using Algorithms 1 and 2 for storing and retrieving a sensitive value, and Algorithm 4 for performing the initial distributed key generation protocol, arbitrary PUF-enabled threshold cryptographic operations (e.g., decryption, digital signatures, zero knowledge proofs) can be performed. Algorithm 5 describes how to evaluate an arbitrary threshold cryptographic operation $\mathcal{O}$ that includes as input a participant's share $r_i$. Note that the recovered share $r_i$ has already been multiplied by the Lagrange terms $$\left( \Pi_{j=1, j \neq i}^{t} \frac{-j}{i-j} \right).$$

---

Algorithm 5 PUF-Threshold-OP

---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each challenge $c_i$ (Challenge $c = c_0||\ldots||c_n$) do
        Read challenge $c_i$ and helper data $h_i$
        Recover share $r_i \leftarrow$ PUF-Retrieve($c_i, h_i$)
        Perform threshold operation $\mathcal{O}(r_i, Aux)$
    end for
    Combine threshold operations $\mathcal{O} \leftarrow$ Combine($\{\mathcal{O}(r_i, Aux)\}_{0 \leq i \leq n}$)
    return Result $\mathcal{O}$
end for -continued Algorithm 5 PUF-Threshold-OP for Server s do
   Process operation $\mathcal{O}$
end for This enables any threshold cryptographic operation (e.g., decryption, digital signature generation, zero knowledge proofs) to be performed by a PUF-enabled participant without ever generating, reconstructing, or storing their private key. Further, from an external perspective (e.g., the server), the PUF-enabled device simply implements standard public key cryptographic protocols. That is, the server never issues a challenge or stores helper data, and its interaction with the device is indistinguishable from any standard public key cryptography device. As an example, a device may be equipped, e.g., with two PUF circuits (e.g., ring oscillator, arbiter, SRAM) and provided with the ability to execute at least two instructions at the same time (e.g., through multiple CPU cores).

One embodiment of such a device may comprise a Xilinx Artix 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the device's external input and output and to perform algorithms (sending elliptic curve and other mathematical calculations to the math engine) such as those described above. The FPGA may have one or more PUF circuits implemented in separate areas of the FPGA fabric. Simultaneous execution may be accomplished by instantiating multiple software CPUs, e.g., a MicroBlaze processor. (It is noted that where it is stated herein that the 'device' performs an action, it is implicit that such action is or may be carried out by an appropriately-configured processor in the device unless something different is apparent from the context. It is further intended that the word 'processor' is inclusive of multiple discrete processors together performing recited actions, processors with multiple cores, etc.).

As a further example, a device may be equipped, e.g., with a block of phase change memory (PCM), dynamic random access memory (DRAM), or other memory that may be physically reconfigured. One embodiment of such a device may comprise an application-specific integrated circuit (ASIC) configured to interact with the DRAM block. Another embodiment of such a device may comprise a system on a chip (SoC) configured to interact with the DRAM block. Yet another embodiment of such a device may be a generic CPU configured to interact with the DRAM block.

Figure 2:
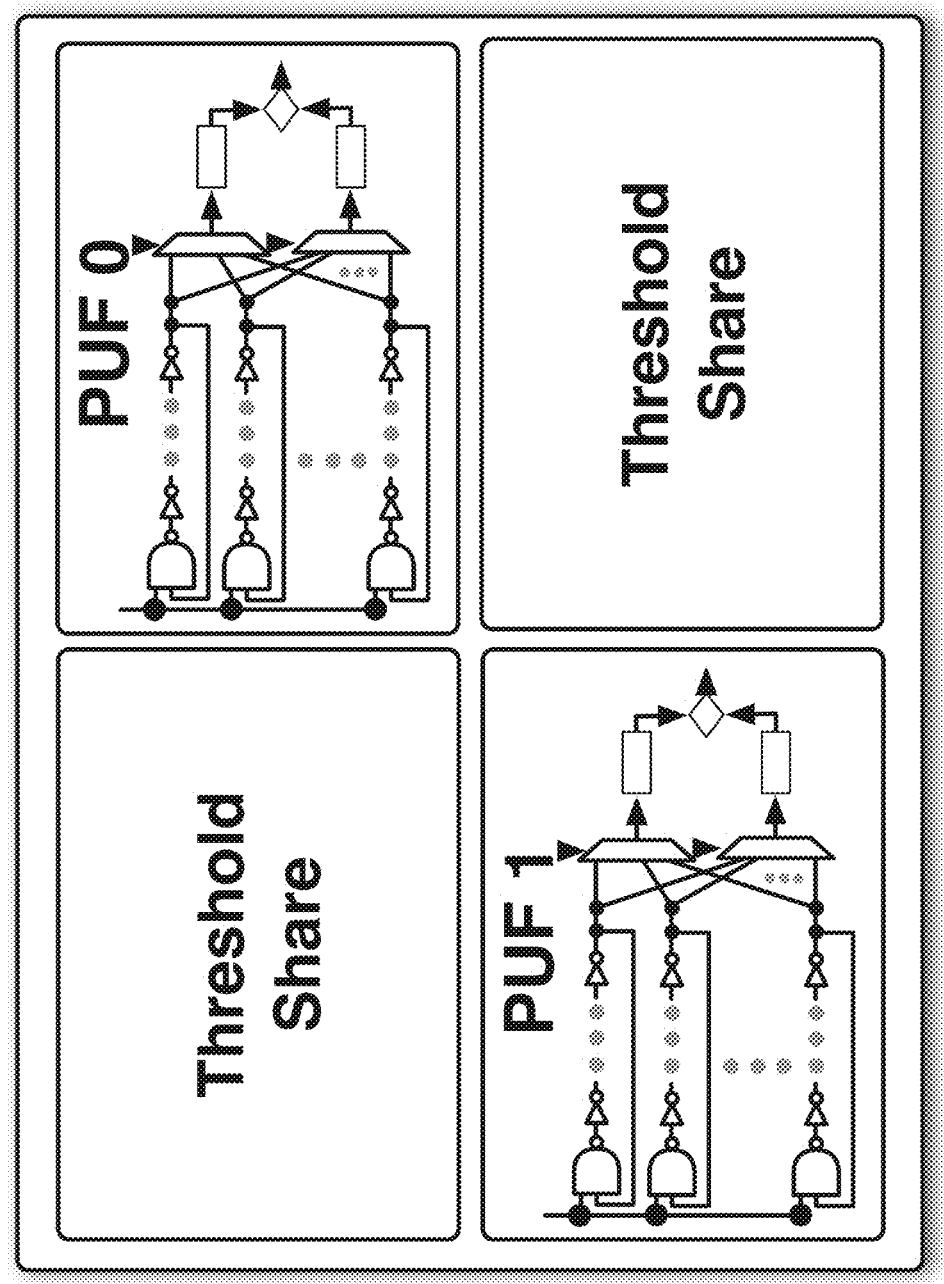
FIG. 2 is a functional diagram of a device with two PUF circuits each having a share of a sensitive value.

An embodiment of the present invention with only one PUF circuit would simply execute operations over each share sequentially, rather than querying the multiple PUF circuits in parallel. FIG. 2 illustrates a device equipped with two PUF circuits to enable local threshold cryptographic operations; the device may be, for example, an FPGA with a separate core containing each PUF. The potentially extractable output of a single PUF may then be obviated by constructing a local (2, 2) threshold system with each of the parts $p_i$ acting as a distinct participant.

For example, each part may select a random challenge, run the enrollment algorithm (Algorithm 3) to generate an asymmetric key pair $\langle p_i^{pub}=p_i^{priv}\cdot G, p_i^{priv}\rangle$ and locally store its public enrollment information and then together run the distributed key generation protocol (Algorithm 4) and perform all cryptographic operations over a private key that is never actually constructed. When threshold cryptography is applied within a single device, it may not be necessary to run the enrollment algorithm (Algorithm 3) to generate an asymmetric key pair as all computations are performed internal to the device.

Algorithm 6 describes how a dual-PUF device can compute cryptographic operations in a threshold manner by constructing a (2, 2) threshold sharing within the device using distributed key generation. That is, the two parts establish a private key known to neither part through distributed key generation and publicize the corresponding public key $\mathcal{P}^{pub}$. All operations targeted at the device are now performed in a threshold manner through internal collaboration (with each part retrieving its share $r_i$ and performing a local threshold operation, and the results are combined to complete a threshold operation $\mathcal{O}$), while the input/output behavior of the device remains unchanged to external systems.

Algorithm 6 Dual-PUF-Threshold-OP

Goal: Perform threshold operation $\mathcal{O}$ at time $\tau$
One-Time Setup Stage
for each PUF Core $p_i \in \mathcal{P}$ do
   Run Algorithm 3: Enrollment, Publicize $p_i^{pub}$
end for
Run (2, 2)-PUF-DKG, Publicize $\mathcal{P}^{pub}$
Evaluation Stage
for each PUF Core $p_i \in \mathcal{P}$ do
   Recover share $r_i^{(\tau)} \leftarrow$ PUF-Retrieve($c_i^{(\tau)}$, helper$_i^{(\tau)}$)
   $p_i^{(\mathcal{O})} \leftarrow \mathcal{O}(r_i^{(\tau)})$, PUF core local threshold share
end for
return $\mathcal{O} \leftarrow$ Combine($\{p_0^{(\mathcal{O})}, p_1^{(\mathcal{O})}\}$)

Figure 3:
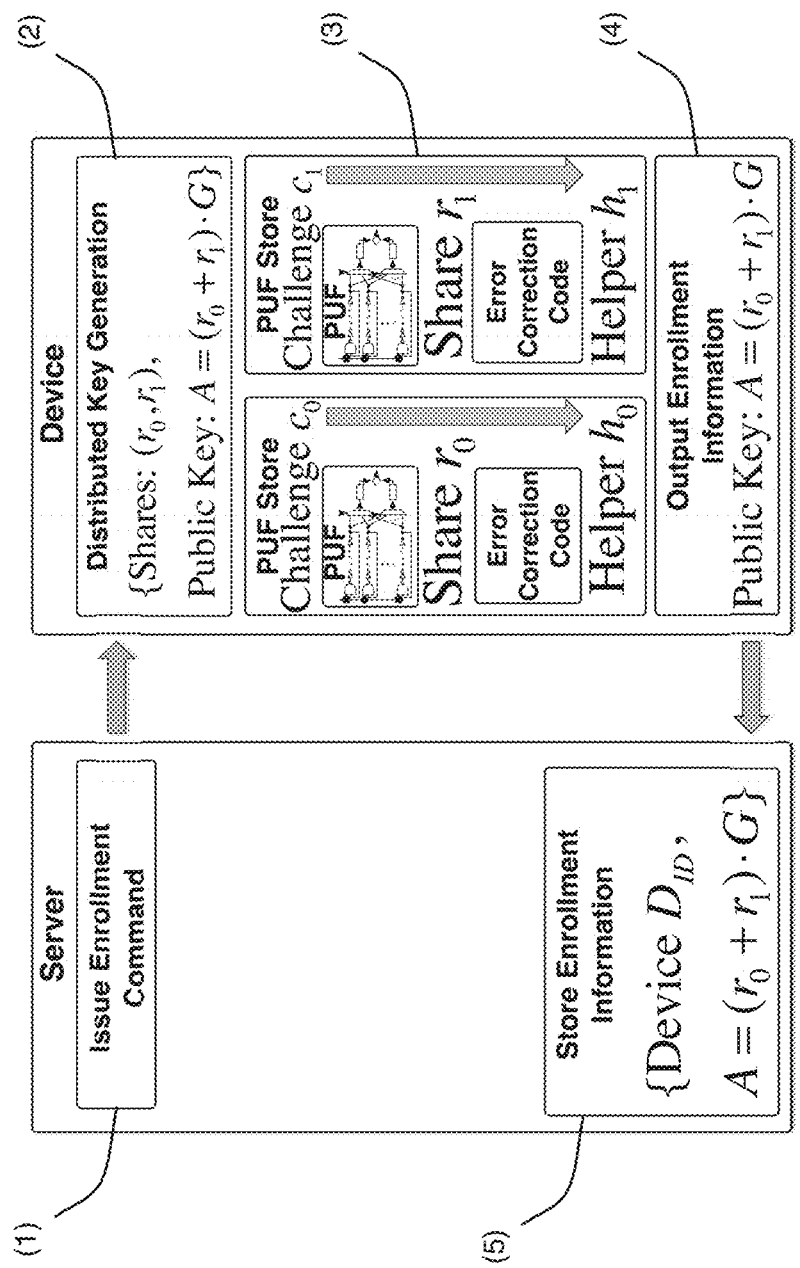
FIG. 3 is an operational flowchart of enrollment of a device like that of FIG. 2 in an embodiment.
Figure 4:
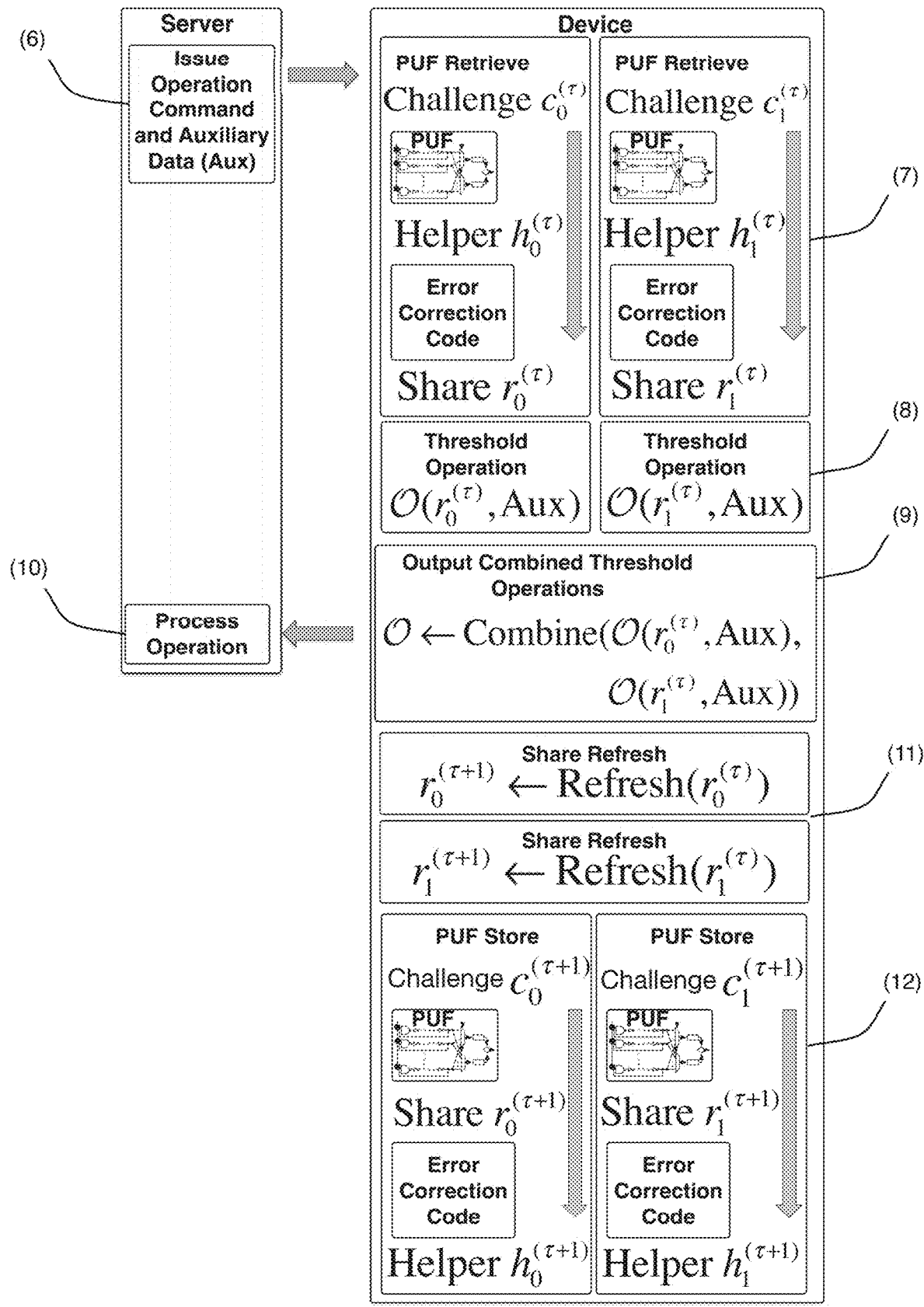
FIG. 4 is an operational flowchart of threshold cryptographic operations in a device like that of FIG. 2 in an embodiment.

Referring to FIG. 3 and FIG. 4, the core operations of an example embodiment employing elliptic curve cryptography, division of a key into two shares, and a (2, 2) threshold operation, are described.

Enrollment Command 1: During the initial enrollment process, the server and device agree on an elliptic curve E defined over a finite field $\mathbb{F}_p$ and base point G of order q, where p is $\lambda$ bits long. The server issues the enrollment command to the device.

Distributed Key Generation 2: The device performs a distributed key generation locally, creating shares ($r_0$, $r_1$) of the master private key (which does not need to be generated or constructed) and its public key A= ($r_0+r_1$)·G. Rather than directly add the shares together (which would construct the private key $r=r_0+r_1$), the public key is formed by computing ($r_0$·G)+($r_1$·G).

Helper Data Generation 3: The device generates a random challenge $c=c_0 \| c_1$, where $\|$ denotes concatenation and each $c_i$ block is $\lambda$ bits long. The device links each share $r_i$ to the output $O_i$ of the PUF on challenge $c_i$ through fuzzy extraction, which outputs a public helper $h_i$. As the PUF output $O_i$ is noisy, there is no guarantee that when queried on challenge $c_i$ in the future, the new output $O_i'$ will satisfy $O_i'=O_i$. However, it is assumed that $O_i$ and $O_i'$ will be t-close with respect to some distance metric (e.g. Hamming distance). Thus, an error correcting code may be applied to the PUF output such that at most t errors will still recover $O_i$. Error correction may be applied over each share $r_i$, and this value blinded with the output of the PUF $O_i$ on challenge $c_i$, so that each helper value $h_i = ECC(r_i) \oplus O_i$ reveals no information about share $r_i$. During recovery through fuzzy extraction, computing the exclusive-or of ECC $(r_i) \oplus O_i \oplus O_i'$ will return $O_i$ whenever $O_i$ and $O_i'$ are t-close. The device locally stores the challenge $c = c_0 \| c_1$ and helper data $h = h_0 \| h_1$, which will allow it to later recover the shares. Note that both the challenge and the helper data are public, and reveal nothing about the shares or the device's private key without invoking the PUF. This process is described by Algorithm 1.

Returned Public Key 4: The device returns its public enrollment information $\{A = (r_0 + r_1) \cdot G\}$ to the server.

Store Enrollment 5: The server stores the device's public enrollment information along with a (non-sensitive) identifier that is unique to the device (e.g., a serial number).

Threshold Operation Query 6: When the server wishes the device to perform a cryptographic operation (e.g., decryption, digital signature generation, zero knowledge proof authentication), it issues:
  the appropriate command for the operation to be performed
  any auxiliary data Aux for the operation (e.g., ciphertext to be decrypted, a message to be signed)

PUF Retrieval 7: The device reads the challenge $c = c_0 \| c_1$ and helper data $h = h_0 \| h_1$ from its local storage. The device then queries the PUF on each challenge block $c_i$ and combines the output $O_i'$ with the helper block $h_i$ and error correcting code to recover each share block $r_i$. This process is described by Algorithm 2.

Threshold Operation 8: The device performs a threshold operation $\mathcal{O}(r_i, \text{Aux})$ over each share $r_i$. Algorithm 5 describes this process for any arbitrary threshold operation $\mathcal{O}$.

Combined Threshold Operations 9: The device combines the threshold operations to form the complete operation $\mathcal{O}$ and returns the result to the server.

Process Operation 10: The server finally performs any additional processing for the operation (e.g., verifying a zero knowledge proof).

Share Refreshing

Various share refresh protocols allow each of a set of players $p_i \in \mathcal{P}$ to refresh their share $r_i^{(\tau)}$ of an original secret r at time period $\tau$ into a new share $r_i^{(\tau+1)}$ such that the resulting set of new shares $\{r_i^{(\tau+1)}\}_{i \in [1 \ldots n]}$ remains a sharing of the original secret. This protocol does not require reconstruction of the master secret r, so a mobile adversary would have to compromise t players in a fixed time period $\tau$ in order to recover the shared secret. Assuming a polynomial $f(\cdot)$ of degree $(t-1)$ represents a shared secret $r = f(0)$ amongst n participants each having a share $r_i = f(i)$, and denoting encrypting for player $p_j$ as $ENC_j(\cdot)$ and decryption by $p_j$ as $DEC_j(\cdot)$, the set of players $p_i \in \mathcal{P}$ can refresh their sharing of r using such a protocol as follows:

Each player $p_i$ defines a new polynomial of degree $(t-1)$ such that $\delta_i(0) = 0$:

$$\delta_i(\cdot) = \Delta_1^{(i)} x + \ldots + \Delta_m^{(i)} x^{t-1}$$

where the set $\{\Delta_m^{(i)}\}_{m \in [1 \ldots t-1]}$ is chosen randomly from $\mathbb{Z}_q$.

Each player $p_i$ computes the following sets:

$$\{\epsilon_{im} = \Delta_m^{(i)} \cdot G\}_{m \in [1 \ldots t-1]}$$

$$\{u_{ij} = \delta_i(j)\}_{j \in [1 \ldots n]}$$

$$\{e_{ij} = ENC_j(u_{ij})\}_{j \in [1 \ldots n]}$$

and broadcasts a verifiable secret sharing $VSS_i^{(\tau)} = \langle i, \tau, \{\epsilon_{im}\}, \{e_{ij}\}\rangle$ and their signature $SIG_i(VSS_i^{(\tau)})$.

Each player $p_i$ recovers $u_{ij} = DEC_i(ENC_i(u_{ji}))$ and verifies $\forall j \neq i$:

$$u_{ji} \cdot G \stackrel{?}{=} \sum_{k=1}^{t-1} i^k \epsilon_{jk}$$

$$= \sum_{k=1}^{t-1} (i^k \Delta_k^{(j)} \cdot G)$$

$$= G \cdot \sum_{k=1}^{t-1} i^k \Delta_k^{(j)}$$

$$= G \cdot \delta_j(i) = G \cdot u_{ji}$$

Finally, each player $p_i$ updates their share from time period $(\tau)$ as:

$$r_i^{(\tau+1)} \leftarrow r_i^{(\tau)} + \left(\sum_{j=1}^{n} u_{ji} \bmod q\right)$$

Thus, the refreshed set of shares $\{r_i^{(\tau+1)}\}_{i \in [1 \ldots n]}$ remains a sharing of the master private key $\mathcal{P}^{priv}$ and yet knowledge of $t-1$ or fewer shares from time period $\tau$ is useless in time period $\tau+1$.

As outlined in Algorithm 7, participants can update their share $r_i^{(\tau)}$ in time period $\tau$ to a new share $r_i^{(\tau+1)}$ in the next time period such that the set of shares $\{r_i\}_{i \in [1 \ldots n]}$ remains a sharing of the master private key $\mathcal{P}^{priv}$.

---

Algorithm 7 PUF-Share-Update

---

Goal: Generate new share $r_i^{(\tau+1)}$
for all Participants $p_i \in \mathcal{P}$ do
  Recover share $r_i^{(\tau)}$
      $r_i^{(\tau)} \leftarrow$ PUF-Retrieve$(c_i^{(\tau)}, \text{helper}_i^{(\tau)})$
  Select random polynomial of degree $(t-1)$ such that $\delta_i(0) = 0$:
      $\delta_i(\cdot) = \Delta_1^{(i)} x + \ldots + \Delta_m^{(i)} x^{t-1}$
  Compute
      $\{\epsilon_{im} = \Delta_m^{(i)} \cdot G\}_{m \in [1 \ldots t-1]}$
      $\{u_{ij} = \delta_i(j)\}_{j \in [1 \ldots n]}$
      $\{e_{ij} = ENC_j(u_{ij})\}_{j \in [1 \ldots n]}$
  Broadcast
      $VSS_i^{(\tau)} = \langle i, \tau, \{\epsilon_{im}\}, \{e_{ij}\}\rangle$,
      $SIG_i(VSS_i^{(\tau)})$
  Verify $\forall j \neq i$ $$DEC_i(ENC_i(u_{ji})) \cdot G \stackrel{?}{=} \sum_{k=1}^{t} i^k \epsilon_{jk}$$

Update share as:

$$r_i^{(\tau+1)} \leftarrow r_i^{(\tau)} + \left(\sum_{j=1}^{n} u_{ji} \bmod q\right)$$

Store $r_i^{(\tau+1)}$ and update PUF challenge:
      $\{c_i^{(\tau+1)}, \text{helper}_i^{(\tau+1)}\} \leftarrow$ PUF-Store$(r_i^{(\tau+1)})$
end for The hardware device performs Algorithm 7 for example at Share Refresh 11 in FIG. 4 to generate new shares $r_i^{(\tau+1)}$ for the next time period $\tau+1$. At PUF Refresh and Store 12, the hardware device generates a new challenge $c_i^{(\tau+1)}$, which will refresh the challenge-helper pair for the next time period. The hardware device uses the new challenge to store the updated share $r_i^{(\tau+1)}$. Algorithms 5 and 6 are modified to refresh both the threshold shares as well as the challenge-helper pair, with Algorithms 8 and 9, respectively, reflecting the modifications.

---
Algorithm 8 PUF-Threshold-OP-Refreshing
---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each challenge $c_i$ (Challenge $c = c_0 || ... || c_n$) do
        Read challenge $c_i$ and helper data $h_i$
        Recover share $r_i \leftarrow$ PUF-Retrieve($c_i, h_i$)
        Perform threshold operation $\mathcal{O}(r_i, \text{Aux})$
    end for
    Combine threshold operations $\mathcal{O} \leftarrow$ Combine($\{\mathcal{O}(r_i, \text{Aux})\}_{0 \leq i \leq n}$)
    return Result $\mathcal{O}$
    for each share $r_i$ do
        Update share
$$r_i^{(\tau+1)} \leftarrow \text{PUF-Share-Update}(r_i^{(\tau)})$$
        Store $r_i^{(\tau+1)}$ and update PUF challenge:
$$\{c_i^{(\tau+1)}, \text{helper}_i^{(\tau+1)}\} \leftarrow \text{PUF-Store}(r_i^{(\tau+1)})$$
    end for
end for
for Server s do
    Process operation $\mathcal{O}$
end for ---
Algorithm 9 Dual-PUF-Threshold-OP-Refreshing
---

Goal: Perform threshold operation $\mathcal{O}$ at time $\tau$
One-Time Setup Stage
for each PUF Core $p_i \in \mathcal{P}$ do
    Run Algorithm 3: Enrollment, Publicize $p_i^{pub}$
end for
Run (2, 2)-PUF-DKG Protocol, Publicize $\mathcal{P}^{pub}$
Evaluation Stage
for each PUF Core $p_i \in \mathcal{P}$ do
    Recover share $r_i^{(\tau)} \leftarrow$ PUF-Retrieve($c_i^{(\tau)}, \text{helper}_i^{(\tau)}$)
    $p_i^{(\mathcal{O})} \leftarrow \mathcal{O}(r_i^{(\tau)})$, PUF core local threshold share
    Update share
$$r_i^{(\tau+1)} \leftarrow \text{PUF-Share-Update}(r_i^{(\tau)})$$
    Store $r_i^{(\tau+1)}$), and update PUF challenge:
$$\{c_i^{(\tau+1)}, \text{helper}_i^{(\tau+1)}\} \leftarrow \text{PUF-Store}(r_i^{(\tau+1)})$$
end for
return $\mathcal{O} \leftarrow$ Combine($\{p_0^{(\mathcal{O})}, p_1^{(\mathcal{O})}\}$)

---

Referring for example to a single-PUF embodiment as shown in FIG. 1, share updating may optionally be logically split into a preparation phase (Algorithm 10) and an application phase (Algorithm 11). During preparation, each participant generates its random polynomial and distributes its portion of the update to the other participants. After all participants have broadcast their portions of the share update, the preparation phase is complete. (Broadcasting may be omitted if preparation is applied within a single device such as an FPGA).

---
Algorithm 10 PUF-Share-Update-Preparation
---

Goal: Prepare update to construct share $r_i^{(\tau+1)}$
for all Participants $p_i \in \mathcal{P}$ do
    Select random polynomial of degree (t − 1) such that $\delta_i(0) = 0$:
$$\delta_i(\cdot) = \Delta_1^{(i)} x + ... + \Delta_m^{(i)} x^{t-1}$$
    Compute
$$\{\in_{im} = \Delta_m^{(i)} \cdot G\}_{m \in [1...t-1]}$$
$$\{u_{ij} = \delta_i(j)\}_{j \in [1...n]}$$
$$\{e_{ij} = \text{ENC}_j(u_{ij})\}_{j \in [1...n]}$$
    Broadcast
$$\text{VSS}_i^{(\tau)} = \langle i, \tau, \{\in_{im}\}, \{e_{ij}\} \rangle,$$
$$\text{SIG}_i(\text{VSS}_i^{(\tau)})$$
end for

---

Next, each participant verifies the update information received from other participants and applies the update to its share as set forth in Algorithm 11.

---
Algorithm 11 PUF-Share-Update-Application
---

Goal: Apply share update to construct $r_i^{(\tau+1)}$
for all Participants $p_i \in \mathcal{P}$ do
    Recover share $r_i^{(\tau)}$
$$r_i^{(\tau)} \leftarrow \text{PUF-Retrieve}(c_i^{(\tau)}, \text{helper}_i^{(\tau)})$$
    Verify $\forall j \neq i$
$$\text{DEC}_i(\text{ENC}_i(u_{ji})) \cdot G \stackrel{?}{=} \sum_{k=1}^{t} j^k \in_{jk}$$
    Update share as:
$$r_i^{(\tau+1)} \leftarrow r_i^{(\tau)} + \left( \sum_{j=1}^{n} u_{ji} \mod q \right)$$
end for

---

As each threshold operation over a share can be performed independently of the other shares, the device can be configured to recover one share at a time. This process is illustrated in Algorithm 12. Upon receiving a command $\mathcal{O}$ and its associated auxiliary information Aux, the device first performs Algorithm 10 to prepare for the share update. Next, the device iteratively performs threshold operations over each share. A share is recovered by reading a challenge-helper pair from non-volatile memory, and using the PUF to regenerate the corresponding share. After performing a threshold operation over the share, the share update is applied using Algorithm 11, which generates the updated share for new time period ($\tau+1$). After computing the threshold operations over each share, the threshold operations are combined to form the result $\mathcal{O}$ which is returned to the server.

---
Algorithm 12 PUF-Threshold-OP-Staggered
---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each share $r_i$ do
        PUF-Share-Update-Preparation
    end for
    for each challenge $c_i$ (Challenge $c = c_0 || ... || c_n$) do
        Read challenge $c_i$ and helper data $h_i$
        Recover share $r_i \leftarrow$ PUF-Retrieve($c_i, h_i$)

-continued

Algorithm 12 PUF-Threshold-OP-Staggered

```
    Perform threshold operation 𝒪(r_i, Aux)
    Update share
        r_i^(τ+1) ← PUF-Share-Update-Application(r_i^(τ))
    Store r_i^(τ+1) and update PUF challenge:
        {c_i^(τ+1), helper_i^(τ+1)} ← PUF-Store(r_i^(τ+1))
    end for
    Combine threshold operations 𝒪 ← Combine({𝒪(r_i,
        Aux)}_{0≤i≤n})
    return Result^𝒪
  end for
  for Server s do
    Process operation 𝒪
  end for
```

In one embodiment, a (2, 2) threshold system is constructed internally to the device. Algorithm 13 illustrates an example of a single-PUF (2, 2) threshold construction of the more general Algorithm 12. The device has the share set $\{r_0, r_1\}$, and iteratively computes a threshold operation over each share to produce the set $\{p_0^{(\mathcal{O})}, p_1^{(\mathcal{O})}\}$. Once both threshold operations are complete and the shares have been updated and stored, the two threshold operations are combined into the final output $\mathcal{O}$.

Algorithm 13 Internal-PUF-Threshold-OP-Staggered

```
  Goal: Perform threshold operation 𝒪 at time τ
  One-Time Setup Stage
  for each Threshold Share r_i do
    Run Algorithm 3: Enrollment, Publicize p_i^pub
  end for
  Run (2, 2)-PUF-DKG Protocol, Publicize 𝒫^pub
  Evaluation Stage
  for each Threshold Share r_i do
    PUF-Share-Update-Preparation
  end for
  for each Threshold Share r_i do
    Recover share r_i^(τ) ← PUF-Retrieve(c_i^(τ), helper_i^(τ))
    p_i^(𝒪) ← 𝒪(r_i^(τ)), Local threshold operation
    Update share
        r_i^(τ+1) ← PUF-Share-Update-Application(r_i^(τ))
    Store r_i^(τ+1) and update PUF challenge:
        {c_i^(τ+1), helper_i^(τ+1)} ← PUF-Store(r_i^(τ+1))
  end for
  return 𝒪 ← Combine({p_0^(𝒪), p_1^(𝒪)})
```

Figure 5:
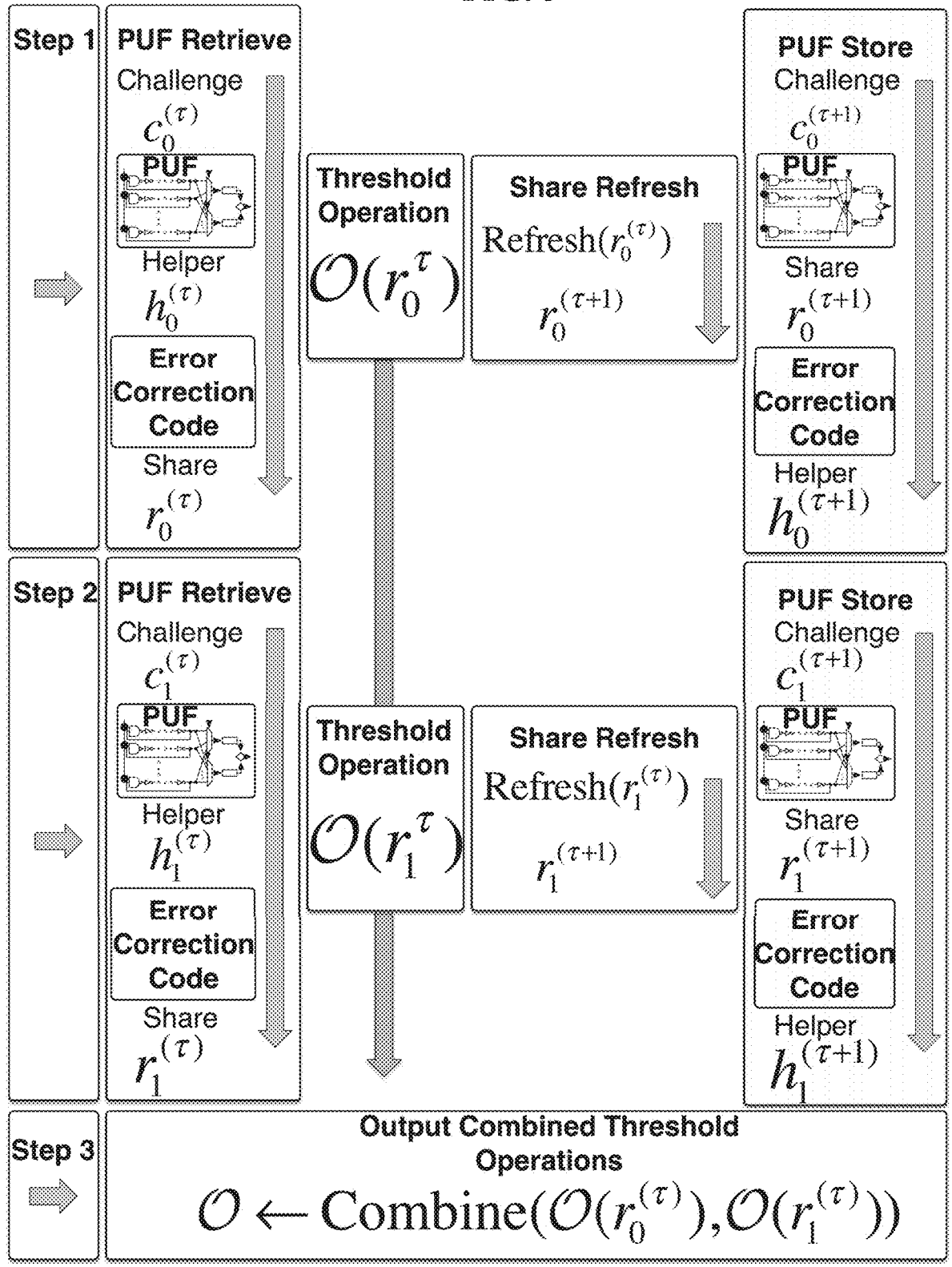
FIG. 5 is an operational flowchart of the staggered threshold cryptographic operations in a device like that of FIG. 1 in an embodiment.

The flow of Algorithm 13, a specific single-PUF (2, 2) threshold construction of the more general Algorithm 12, is illustrated in FIG. 5. Prior to Step 1, the share update preparation Algorithm 10) is performed. In Step 1, the first share $r_0^\tau$ is retrieved and its corresponding local threshold operation is performed. The share update (Algorithm 11) is then applied to $r_0^\tau$ to yield $r_0^{(\tau+1)}$ for the next time period. The updated share is then stored using a new random challenge $c_0^{(\tau+1)}$ which generates the corresponding helper data $h_0^{(\tau+1)}$ which will allow the updated share to be recovered using the PUF. The same process is followed in Step 2 for share $r_1^\tau$. Finally, the combined output $\mathcal{O}$ is constructed by combining the two local threshold operations that were performed over each share.

The device has a constant identity $\langle \mathcal{P}^{pub}, \mathcal{P}^{priv} \rangle$, yet all operations $\mathcal{O}$ that use $\mathcal{P}^{priv}$ can be performed without ever reconstructing $\mathcal{P}^{priv}$ and with values that change after each operation is executed. As each part uses the PUF-Store and PUF-Retrieve algorithms to maintain its share, the (challenge, helper) pair is updated after each operation when PUF-Store is executed. Each share is refreshed for the new time period τ+1, and is stored by generating a new random challenge $c_i^{(\tau+1)}$ and setting the updated helper to $helper_i^{(\tau+1)} \leftarrow ECC(r_i^{(\tau+1)}) \oplus PUF(c_i^{(\tau+1)})$. Staggering the threshold operations such that the share regeneration, threshold operation, and share storing occur consecutively (rather than concurrently), precludes the simultaneous recovery of more than one updated share.

In addition to asymmetric operations, symmetric cryptographic operations may also be performed in a threshold manner. Thus all cryptographic operations, asymmetric and symmetric, can be performed over threshold shares rather than the private key. As with the refreshing process described for shares of an asymmetric private key, the shares of a symmetric key may also be refreshed.

Dynamic Membership

The dynamic nature of shares in this construct also permits an embodiment in which the number of participants n participating in a group can be varied dynamically so that participants may join or leave the set of participants in the (t, n) threshold system. In this case, up to n–t participants can be removed from the set $\mathcal{P}$ simply by leaving them out of the next share refresh protocol. To add a participant $p_j$ to the set of participants, each current participant $p_i$ generates an extra share $u_{ij}$ from their share update polynomial $\delta_i(\cdot)$.

To add a new participant $p_{new}$ with ID new to the set of participants, their share f(new) can be generated by t members with existing shares. This is performed by each of the t members contributing their share interpolated for $p_{new}$, and blinding these sub-shares with a sharing of zero distributed among the t members. The blinding by a sharing of zero helps prevent recovery of the t shares $r_i$ from the sub-shares. That is, as the t participants are known, distributing a sub-share as $$\left( r_i \cdot \left( \prod_{\substack{j=1 \\ j \neq i}}^{t} \frac{new - j}{i - j} \right) \right) \mod q$$

allows the participant $p_{new}$ to remove the Lagrangian interpolation term $$\left( \prod_{\substack{j=1 \\ j \neq i}}^{t} \frac{new - j}{i - j} \right)$$

and recover $p_i$'s share $r_i$, as the t members that contribute sub-shares are known to $p_{new}$.

To prevent $p_{new}$ from recovering an existing share $r_i$ from the sub-share, each sub-share is blinded using separate shares of a sharing of 0 among the t members. Algorithm 14 describes how shares of 0 are generated and distributed to the other existing t members.

Algorithm 14 Share-Blinding

```
  Goal: Prepare a sharing of 0
  for all Participants p_i ∈ 𝒫 do
    Select random polynomial of degree (t − 1) such that δ_i(0) = 0:
        δ_i(·) = Δ_1^(i) x + ... + Δ_m^(i) x^{t-1}
    Compute
        {∈_im = Δ_m^(i) · G}_{m∈[1...t-1]}
        {u_ij = δ_i(j)}_{j∈[1...t]}
        {e_ij = ENC_j(u_ij)}_{j∈[1...t]}
```

-continued

Algorithm 14 Share-Blinding

Broadcast
$$VSS_i^{(\tau)} = \langle i, \tau, \{\in_{jm}\}, \{e_{ij}\} \rangle, SIG_i(VSS_i^{(\tau)})$$
end for Each participant $p_i \in \mathcal{P}$, $|\mathcal{P}| \geq t$ generates a polynomial $\delta_i(\bullet)$ where the free coefficient $\Delta_0^{(i)} = 0$, and consequently $\delta_i(0) = 0$. Each participant then distributes shares of their polynomial $\delta_i(j)$ to the other players $p_{j,j \neq i} \in \mathcal{P}$ to complete a verifiable sharing of 0. Thus, these shares can be used to blind another sharing without changing the secret being shared.

Upon receiving the sharing of 0, each participant will verify the shares and use them to blind their sub-shares for new participant $p_{new}$. Algorithm 15 describes how the sharing of 0 is verified, the local sub-share of $p_{new}$'s share is constructed, and how it is blinded before being distributed to $p_{new}$.

Algorithm 15 Share-Construction

Goal: Enable new participant $p_{new}$ to construct a new share $r_{new}$
for all Participants $p_i \in \mathcal{P}$ do
  Recover share $r_i^{(\tau)}$
    $r_i^{(\tau)} \leftarrow$ PUF-Retrieve($c_i^{(\tau)}$, helper$_i^{(\tau)}$)
  Verify $\forall j \neq i$ $$DEC_i(ENC_i(u_{ji})) \cdot G \stackrel{?}{=} \sum_{k=1}^{t} j^k \in_{jk}$$

Construct sub-share $r_{new}^i$ for $p_{new}$ $$r_{new}^j \leftarrow \left( r_i^{(\tau)} \cdot \left( \prod_{\substack{j=1 \\ j \neq i}}^{t} \frac{new - j}{i - j} \right) \right) \bmod q$$

Blind sub-share with sharing of 0 from Algorithm 14: Share-Blinding $$r_{new}^j \leftarrow r_{new}^j + \sum_{i=1}^{t} \left( u_{ji} \cdot \left( \prod_{\substack{j=1 \\ j \neq i}}^{t} \frac{-j}{i-j} \right) \right) \bmod q$$

$p_{new} \leftarrow ENC_{p_{new}}(r_{new}^i)$
Update share
    $r_i^{(\tau+1)} \leftarrow$ PUF-Share-Update-Application($r_i^{(\tau)}$)
Store $r_i^{(\tau+1)}$ and update PUF challenge:
    $\{c_i^{(\tau+1)}, helper_i^{(\tau+1)}\} \leftarrow$ PUF-Store(PUF$_i$, $r_i^{(\tau+1)}$)
end for
for New Participant $p_{new}$ do
  for all $i \in \mathcal{P}$ do
    $r_{new}^i \leftarrow DEC_{p_{new}}(ENC_{p_{new}}(r_{new}^i))$
  end for
  $r_{new}^{(\tau)} = \sum_{i=1}^{t} r_{new}^i \bmod q$
  $r_{new}^{(\tau+1)} \leftarrow$ PUF-Share-Update-Application($r_{new}^{(\tau)}$)
  $\{c_{new}^{(\tau+1)}, helper_{new}^{(\tau+1)}\} \leftarrow$ PUF-Store(PUF$_{new}$, $r_{new}^{(\tau+1)}$)
end for The process of constructing a new or replacement share for participant $p_{new}$ is described in Algorithm 15. Each of the t participants $p_i \in \mathcal{P}$ begins by recovering their share $r_i^{(\tau)}$ and verifying the sharing of 0 they received from Algorithm 14. The sub-share $r_{new}^i$ generated by participant $p_i$ is constructed by performing their portion of Lagrangian interpolation for f(new), where new is the ID of the new participant. This sub-share is subsequently blinded using the sharing of 0 to prevent the new participant $p_{new}$ from recovering the share $r_i$ of participant $p_i$ by removing the Lagrangian interpolation term. After sending their sub-share to $p_{new}$, participant $p_i$ updates their share to the new time period $(\tau+1)$ and stores this value using a PUF. All of the received sub-shares are combined by the new participant $p_{new}$ to form their share $r_{new}^{(\tau)}$, which is finally updated for time period $(\tau+1)$ and stored using a PUF.

PUF-Based Tamper Penalties

The dynamic nature of shares in the share refreshing scheme described above allows n−t shares to leave the (t, n) threshold system; a share can be removed from the set $\mathcal{P}$ simply by leaving it out of the next share refresh protocol. In one embodiment, a tamper-resistant device or system uses cryptographic (threshold) sharing with share refreshing in conjunction with one or more PUFs to impose a penalty for events detected by the device or system as tampering. The device or system is configured such that upon the detection of such an event, one share is invalidated by invoking a share refresh protocol (see Algorithms 7-13) and leaving one share out. Given the new sharing of the sensitive value by the remaining shares, the challenge-helper pair corresponding to the old, omitted share is no longer usable. After n−t+1 penalties, only t−1 shares remain and the system or device is rendered inoperable as it is configured to require knowledge of at least t valid shares of the sensitive value (e.g., private key $\mathcal{P}^{priv}$) in order to operate correctly.

The enforcement of invalidation of used challenge-helper pairs in the foregoing refreshing-share embodiment may be improved through the application of reconfigurable PUFs ('RPUFs'). Physically reconfigurable PUFs (P-RPUFs) can, for example, be achieved using phase change memory (PCM), which is a candidate replacement for Flash and DRAM and may become common to many architectures. A P-RPUF can be instantiated using PCM, and n P-RPUFs can be instantiated on a device with one share allocated to each RPUF and the memory space including one block for each share. Upon detection of a tamper event, one RPUF is reconfigured so as to render its associated challenge-helper pairs invalid. For example, in a (2, 4) sharing the system will tolerate two detected tamper events but then is permanently disabled upon a third event. Each time a tamper event occurs and a RPUF is reconfigured, it is removed from the set of n RPUFs. This process is illustrated in Algorithm 16.

Algorithm 16 RPUF Reconfiguration Tamper Penalty

Goal: Impose Penalty for Tamper Event ε
for Adversary $\mathcal{A}$ do
  Tampering Event ε
end for
for Device d do
  Tampering Event ε detected, penalty triggered
  rc $\in \{0, 1\}^\lambda \leftarrow$ TRNG
  $\overline{PUF_n} \leftarrow$ reconfig(PUF$_n$, rc)
  n ← n − 1
  for each share $r_i^{(\tau)}$, 1 ≤ i ≤ n do
    PUF-Share-Update-Preparation
  end for
  for all PUF$_i$, 1 ≤ i ≤ n do
    Read challenge $c_i^{(\tau)}$ and helper data $h_i^{(\tau)}$
    Recover share $r_i^{(\tau)} \leftarrow$ PUF-Retrieve(PUF$_i$, $c_i^{(\tau)}$, $h_i^{(\tau)}$)
    Perform threshold operation $\mathcal{O}(r_i^{(\tau)}, Aux)$
    Update share
        $r_i^{(\tau+1)} \leftarrow$ PUF-Share-Update-Application($r_i^{(\tau)}$)
    rc $\in \{0, 1\}^\lambda \leftarrow$ TRNG
    $\overline{PUF_i} \leftarrow$ reconfig(PUF$_i$, rc)

-continued

Algorithm 16 RPUF Reconfiguration Tamper Penalty

Figure 6:
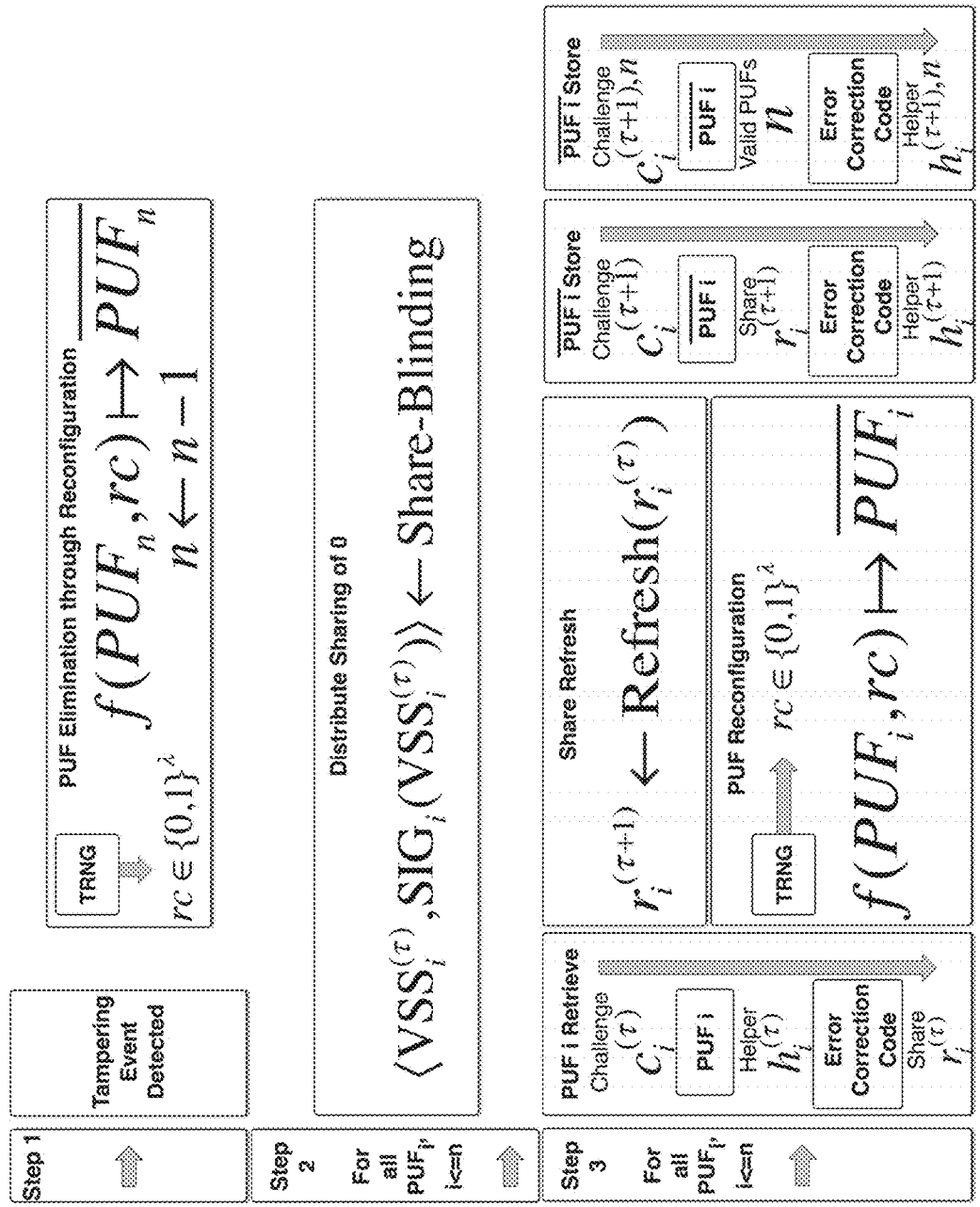
FIG. 6 is an operational flowchart of a device or system employing both RPUFs and cryptographic sharing in a tamper penalty scheme.

Store $r_i^{(\tau+1)}$ and update PUF challenge:
$\{c_i^{(\tau+1)}, helper_i^{(\tau+1)}\} \leftarrow$ PUF-Store($\overline{PUF_i}$, $r_i^{(\tau+1)}$)
$\{c_i^{(\tau+1),n}, helper_i^{(\tau+1),n}\} \leftarrow$ PUF-Store($\overline{PUF_i}$, n)
end for
end for The flow of Algorithm 16 is illustrated in FIG. 6. When the tamper sensor (which may be a physical sensor, and/or electronic sensor such as a photodetector micro-switch, motion detector, RF detector, the PCB sensor disclosed in U.S. Patent App. Publication No. 20160154981 to Wesselhoff, etc., and/or logical or power tamper sensor) detects a tampering event ε, a penalty is triggered which invalidates one of the RPUFs' shares by reconfiguring an RPUF. To select a RPUF share for reconfiguration, the device's processor for example may sample a random reconfiguration string $rc \in \{0, 1\}^\lambda$ and apply it to the nth RPUF $PUF_n$. Each of the remaining unreconfigured RPUFs preferably recovers and refreshes its share, and may be reconfigured prior to storing the updated share as challenge-helper pairs, however, the nth RPUF $PUF_n$'s share is not refreshed. Thus $PUF_n$ will never be able to recover its share due to reconfiguration, reducing the total number of valid RPUFs n by one. Once the number of valid RPUFs is reduced to less than t, the processor cannot perform operations that require knowledge of the secret (depending on the application, the processor may be configured to require knowledge of the secret for all operations, or just for specified sensitive operations). Prior to storing the updated shares of the unreconfigured RPUFs upon a penalty event, the new number of valid RPUFs n=(n−1) optionally may also be stored as challenge-helper pairs. It is noted that an embodiment employing RPUFs to impose tamper penalties may omit share refreshing and reconfiguration of the still-valid RPUFs, which are optional means of improving security more generally. In another embodiment, multiple RPUFs may be employed wherein each RPUF is redundant to the others and is associated with all shares, in which case the nth RPUF $PUF_n$ would be reconfigured on event ε and its shares likewise would not be refreshed.

In another embodiment, a physically reconfigurable PUF (P-RPUF) may be used to impose tamper penalties by removing the configuration data of one or more logically reconfigurable PUFs (L-RPUFs). For example, each of the L-RPUFs may be used to recover one of the n shares in the system. However, L-RPUFs use configuration data to be loaded, and the P-RPUF may be used to securely store this configuration data. For example, the P-RPUF could store a symmetric cryptographic key as a challenge-helper pair, and use the symmetric key to decrypt the set of parameters for the active L-RPUFs. When a tamper penalty is observed, the configuration data for the $n^{th}$ L-RPUF is deleted, a new symmetric key is chosen to encrypt the updated file, the P-RPUF is physically reconfigured, and the updated symmetric key is stored using the reconfigured P-RPUF.

In another embodiment, the device or system may be configured so that tamper events trigger additional actions and/or impose a lasting penalty only if the tamper events occur in a specified fashion or sequence. For example, the processor may be configured to impose penalties as described above during the boot sequence but then subsequent to the boot sequence, immediately after the tamper sensor's detection of a tamper event and ensuing reconfiguration of an RPUF, follow an additional sequence such as requiring the entry of normal or additional user credentials. As another example, in addition to the foregoing example or separately, the processor may be configured to refresh an invalidated RPUF's share anew if specified user credentials are entered and/or if another tamper event does not occur within a specified period of time (e.g., two weeks).

In another embodiment, the device or system may be configured so that the tamper events trigger additional actions and/or impose a penalty that disables the device/system but can be reset by an authorized entity enabling the device/system to function again (effectively resetting the tamper penalty). For example, the processor may be configured to query the PUF to recover sensitive data (e.g., a cryptographic key or share), encrypt the sensitive data using the public key of the authorized entity, store the encrypted sensitive data, and then impose the tamper penalty. This then disables the device/system semi-permanently. However, if the device is brought to the authorized entity, the processor may be configured to provide the stored encrypted sensitive data to the authorized entity for decryption, the decrypted sensitive data can be signed by the authorized entity, then the signed decrypted sensitive data can be provided to the device/system. The device/system processor can then validate the authorized entity's signature is correct and then the processor can use the decrypted sensitive data, allowing the tamper penalty to be reset and the device/system to function correctly again. U.S. Publication 2017-0149572, published on May 25, 2017 describes uses of RPUFs and is incorporated herein by reference in its entirety.

Although certain illustrative embodiments have been described herein, it should be apparent that variations and modifications of the described embodiments may be made without departing from the spirit and scope of the invention. For example, some embodiments use multiple separate keys in place of shares, wherein the device or system is initially provisioned with n keys and t keys establish a threshold number present, in order for the device or system to operate properly, with n being greater than t by the desired number of allowable penalties and one of the keys being permanently destroyed or invalidated upon each detected potential tampering event. It is intended that the invention be limited only to the extent required by the appended claims.

What is claimed is:

1. A tamper resistant authentication device including a tamper threshold, the device comprising:
   a tamper sensor for detecting a tamper event;
   one or more physical unclonable functions (PUFs) for generating respective hardware specific output based on a respective input challenge; and
   at least one processor connected to the tamper sensor and to the one or more PUFs, the at least one processor configured to:
      limit operation of the device in absence of a threshold number of valid shares sufficient to regenerate a shared sensitive value; and
      reduce a number of valid shares to recover the shared sensitive value in a first group of valid shares responsive to a tamper signal received from the tamper sensor, wherein the operation to reduce the number of valid shares prevents subsequent use of at least one share from the first group of the valid shares for recovery of the shared sensitive value and permits recovery of the shared sensitive value based on access to at least the threshold number of valid shares.

2. The device of claim 1, wherein the at least one processor is configured to store challenge helper pairs associating the one or more PUFs to shares of a threshold sharing of the sensitive value.

3. The device of claim 1, wherein the at least one processor is configured to enroll the one or more PUFs in a threshold sharing of the sensitive value without generating the sensitive value in memory.

4. The method of claim 1, wherein the one or more PUFs are reconfigurable PUFs (RPUFs).

5. The device of claim 4, wherein the at least one processor is configured to reconfigure a respective RPUF to reduce the number of valid shares available.

6. The device of claim 4, wherein the at least one processor is configured to derive correspondences between a plurality of shares of the sensitive value and respective challenge-response mappings encoded with helper values.

7. The device of claim 1, further comprising a memory connected to the at least one processor, wherein the at least one processor is configured to store challenge values and corresponding helper values in the memory.

8. The device of claim 7, wherein the at least one processor is configured to:
   generate helper values to encode a mapping between challenge-response values and a plurality of shares of the sensitive value; and
   store at least the challenge helper pairs.

9. The device of claim 7, wherein the device comprises at least n reconfigurable PUFs (RPUFs) and corresponding shares of a threshold secret, and wherein a minimum of t shares are required to regenerate the sensitive value.

10. The device of claim 9, wherein the threshold sharing is constructed for threshold recovery where the minimum of t shares is at least two less than n.

11. The device of claim 1, wherein the threshold number of shares comprise at least a portion of a threshold secret sharing of the sensitive value.

12. The device of claim 1, wherein the at least one processor is configured to encode information regarding which PUFs are invalid.

13. The device of claim 1, wherein the at least one processor is configured to exclude at least one PUF from a share refresh to invalidate share associated with the at least one PUF, responsive to a tamper signal received from the tamper sensor.

14. The device of claim 1, wherein the at least one processor is configured to render the tamper resistant authentication device unable to recover the shared sensitive value and unable to generate a new shared sensitive value from the shared sensitive value responsive to a plurality of tamper signals.

15. A computer implemented method for managing a tamper resistant authentication device, the method comprising:
   generating a respective hardware specific output based on a respective input challenge by one or more physical unclonable functions (PUFs);
   deriving, by at least one processor, correspondences between a plurality of shares of a sensitive value and respective challenge helper pairs of the one or more PUFs;
   limiting, by the at least one processor, operation of the device in absence of a threshold number of shares sufficient to regenerate the shared sensitive value;
   reducing, by the at least one processor, a number of valid shares associated with the sensitive value in a first group of valid shares responsive to a tamper signal received from a tamper sensor, wherein reducing the number of valid shares prevents subsequent use of at least one share from the first group of the valid shares for recovery of the shared sensitive value and permits recovery of the shared sensitive value based on access to at least the threshold number of valid shares.

16. The method of claim 15, further comprising storing for the one or more PUFs a plurality of helper values that correspond to respective challenge-response mapping to valid shares of the sensitive value.

17. The method of claim 15, wherein the plurality of shares of the sensitive value comprise a (t, n) sharing, and the method further comprises:
   provisioning at least n PUFs with corresponding shares of the sensitive value; and
   constructing, by the at least one processor, the corresponding shares of the sensitive value to require a minimum of t shares to reconstruct the sensitive value.

18. The method of claim 17, wherein the one or more PUFs are reconfigurable PUFs (RPUFs), and the act of invalidating, by the at least one processor, the share and corresponding challenge helper pair includes reconfiguring one of the plurality of RPUFs.

19. The method of claim 15, wherein the act of reducing the number of valid shares associated with the sensitive value includes excluding, by the at least one processor, at least one PUF from a share refresh to invalidate the share associated with the at least one PUF.

20. A tamper resistant authentication system including a tamper threshold, the system comprising:
   a tamper sensor for detecting a tamper event;
   one or more hardware identity circuits for generating respective hardware specific output based on a respective input challenge; and
   at least one processor connected to the tamper sensor and to the one or more hardware identity circuits, the at least one processor configured to:
      limit operation of the device in absence of a threshold number of valid shares sufficient to regenerate a shared sensitive value; and
      reduce a number of valid shares to recover the sensitive value in a first group of valid shares responsive to a tamper signal received from the tamper sensor, wherein the operation to reduce the number of valid shares prevents subsequent use of at least one share from the first group of the valid shares for recovery of the shared sensitive value and permits recovery of the shared sensitive value based on access to at least the threshold number of valid shares.

* * * * *